US011511564B2

(12) United States Patent
Hirata et al.

(10) Patent No.: US 11,511,564 B2
(45) Date of Patent: Nov. 29, 2022

(54) ELECTROMOBILITY VEHICLE

(71) Applicant: WHILL, Inc., Tokyo (JP)

(72) Inventors: Yoshihiro Hirata, Tokyo (JP); Tsuyoshi Uchino, Tokyo (JP); Satoshi Nakagawa, Tokyo (JP)

(73) Assignee: WHILL, INC, Tokyo (JP)

(*) Notice: Subject to any disclaimer, the term of this patent is extended or adjusted under 35 U.S.C. 154(b) by 126 days.

(21) Appl. No.: 16/598,840

(22) Filed: Oct. 10, 2019

(65) Prior Publication Data
US 2020/0039288 A1 Feb. 6, 2020

Related U.S. Application Data

(63) Continuation of application No. PCT/JP2018/015289, filed on Apr. 11, 2018.

(30) Foreign Application Priority Data

Apr. 12, 2017 (JP) .............................. JP2017-079203

(51) Int. Cl.
*B60B 19/00* (2006.01)
*A61G 5/10* (2006.01)
*A61G 5/04* (2013.01)

(52) U.S. Cl.
CPC .............. *B60B 19/003* (2013.01); *A61G 5/04* (2013.01); *A61G 5/1081* (2016.11); *B60B 2360/50* (2013.01); *B60Y 2200/84* (2013.01)

(58) Field of Classification Search
CPC . B60B 19/003; B60B 2360/50; A61G 5/1081; A61G 5/04; B60Y 2200/84
See application file for complete search history.

(56) References Cited

U.S. PATENT DOCUMENTS

| 4,483,405 A | * | 11/1984 | Noda | .................... | A61G 5/1051 |
| | | | | | 180/6.5 |
| 4,823,900 A | * | 4/1989 | Farnam | .................. | A61G 5/046 |
| | | | | | 180/251 |

(Continued)

FOREIGN PATENT DOCUMENTS

| CN | 200942841 Y | 9/2007 |
| EP | 1182057 A2 | 2/2002 |

(Continued)

OTHER PUBLICATIONS

Chinese Evaluation Report of Utility Model Patent dated Nov. 17, 2020, in connection with corresponding CN Utility Model Patent No. ZL201890000688.5 (15 pp., including English translation).

(Continued)

*Primary Examiner* — Jacob D Knutson
(74) *Attorney, Agent, or Firm* — Maier & Maier, PLLC

(57) ABSTRACT

This electromobility vehicle includes a vehicle frame, a seat unit mounted to the vehicle frame, a suspension mounted to a front-end side of the vehicle frame, a pair of front wheels aligned in a direction parallel to a width dimension of the vehicle and supported by the suspension, at least one rear wheel supported by the vehicle frame, and a drive device that drives either of the front wheels and the rear wheel, where the front wheels are omnidirectional wheels whose outer circumferential surfaces are formed by a plurality of rollers and the pair of front wheels is supported by the suspension such that it is placed in a toe-in arrangement.

3 Claims, 13 Drawing Sheets

(56) References Cited

U.S. PATENT DOCUMENTS

| | | | | |
|---|---|---|---|---|
| 5,482,125 | A | * | 1/1996 | Pagett .................. A61G 5/042 180/6.32 |
| 5,547,038 | A | | 8/1996 | Madwed |
| 6,109,379 | A | * | 8/2000 | Madwed .............. A61G 5/1051 180/252 |
| 6,547,339 | B2 | | 4/2003 | Bandou et al. |
| 8,459,383 | B1 | * | 6/2013 | Burget .................... B60B 19/14 180/7.1 |
| 9,436,207 | B2 | * | 9/2016 | Fukuoka .............. A61G 5/1051 |
| 10,071,596 | B2 | * | 9/2018 | Jochim ................ B60B 19/003 |
| 10,369,839 | B2 | * | 8/2019 | Deng ................... B60B 19/003 |
| 10,675,912 | B1 | * | 6/2020 | Liang ................... B60B 19/003 |
| 10,849,802 | B2 | * | 12/2020 | Hirata .................. H01R 13/631 |
| 2002/0024250 | A1 | | 2/2002 | Bandou et al. |
| 2010/0084209 | A1 | | 4/2010 | Bekoscke et al. |
| 2012/0299262 | A1 | | 11/2012 | Bekoscke et al. |
| 2014/0232174 | A1 | * | 8/2014 | Zdrahal ................ B60B 33/045 301/5.23 |
| 2014/0339005 | A1 | | 11/2014 | Bekoscke et al. |
| 2015/0196438 | A1 | * | 7/2015 | Mulhern .............. A61G 5/1078 280/5.28 |
| 2017/0172824 | A1 | | 6/2017 | Bekoscke et al. |
| 2019/0343698 | A1 | | 11/2019 | Bekoscke et al. |

FOREIGN PATENT DOCUMENTS

| | | |
|---|---|---|
| EP | 2 272 478 A1 | 1/2011 |
| EP | 2 277 490 A1 | 1/2011 |
| EP | 2 295 017 A1 | 3/2011 |
| JP | H11227404 A | 8/1999 |
| JP | 2001029398 A | 2/2001 |
| JP | 2002137602 A | 5/2002 |
| JP | 2005047312 A * | 2/2005 |
| JP | 2005047312 A | 2/2005 |
| JP | 2005067334 A * | 3/2005 |
| JP | 2006051838 A | 2/2006 |
| JP | 2007195596 A * | 8/2007 |
| JP | 2007195596 A | 8/2007 |
| JP | 2010005347 A | 1/2010 |
| JP | 2010076630 A | 4/2010 |
| JP | 2010089554 A | 4/2010 |
| JP | 2015205542 A | 11/2015 |
| JP | 2016007860 A | 1/2016 |
| WO | 2008/097879 A1 | 8/2008 |

OTHER PUBLICATIONS

Extended European Search Report dated Dec. 18, 2020, in connection with corresponding EP Application No. 18783762.0; 8 pages.
International Search Report, dated Jun. 12, 2018, from corresponding International Application No. PCT/JP2018/015289, with partial English translation, 4 pages.
Chinese Evaluation Report of Utility Model Patent dated Aug. 4, 2021, in connection with corresponding CN Utility Model Patent No. ZL2020214472795 (13 pp., including machine-generated English language translation).

* cited by examiner

ELECTROMOBILITY VEHICLE

CROSS-REFERENCE TO RELATED APPLICATIONS

This application is based on and claims priority to Japanese Patent Application No. 2017-079203 filed on Apr. 12, 2017, the entire content of which is incorporated herein by reference. This application is based on International Patent Application No. PCT/JP2018/015289 filed on Apr. 11, 2018, the entire content of which is incorporated herein by reference.

FIELD

The present invention relates to an electromobility vehicle.

BACKGROUND

As such an electromobility vehicle, an electric wheelchair is known which uses a wheel having an outer circumferential surface formed by a plurality of rollers arranged in a circumferential direction (for example, see Japanese Unexamined Patent Application, Publication No. H11-227404). In the wheel of the wheelchair, a rubber buffer member is interposed between the rollers in order to reduce vibrations that are generated when the rollers come into contact with the ground one after another in response to the rotation of the wheel.

Also, another electromobility vehicle is known, according to which, each roller has a semi-spindle shape in order to reduce the vibrations that are generated when the rollers come into contact with the ground one after another in response to the rotation of the wheel, and the outer circumferential surface of the wheel formed by the rollers has a shape of a substantially smooth circle (for example, see Japanese Unexamined Patent Application, Publication No. 2002-137602).

Also, a still another electromobility vehicle is known according to which rollers are formed in a semi-spindle shape and, in order to suppress idling of the wheels, a pair of front wheels are mounted to a front-end side of a front-wheel-side floor frame of the vehicle, and a pair of rear wheels are mounted to a rear-end side of a rear-wheel-side floor frame of the vehicle, a rear-end side of the front-wheel-side floor frame and a front-end side of the rear-wheel-side floor frame are coupled to each other such that they can swing in a roll direction; a spring is arranged between the front-wheel-side floor frame and the rear-wheel-side floor frame; and the front-wheel-side floor frame is biased by means of the spring relative to the rear-wheel-side floor frame toward a central position in the roll direction (for example, see Japanese Unexamined Patent Application, Publication No. 2005-047312).

SUMMARY OF INVENTION

An electromobility vehicle on which one person is to be seated to ride according to a first aspect of the present invention includes a vehicle frame; a seat mounted on the vehicle frame; a suspension attached to a front-end side of the vehicle frame; a pair of front wheels arranged in a vehicle width direction and supported by the suspension; at least one rear wheel supported by the vehicle frame; and a drive device that drives either of the front wheels and the rear wheel, in which the front wheel is an omnidirectional wheel whose outer circumferential surface is formed by a plurality of rollers and the front wheels are supported by the suspension such that the front wheels are placed in toe-in arrangement.

An electromobility vehicle of a second aspect of the present invention includes a vehicle frame; a seat mounted on the vehicle frame; a suspension attached to the vehicle frame; a pair of wheels arranged in a vehicle-width direction and supported by the suspension; and a drive device that drives either of a non-omnidirectional wheel supported by the support frame and the wheels, wherein the wheel is an omnidirectional wheel whose outer circumferential surface is formed by a plurality of rollers; and the wheel is supported by the suspension such that the wheels are placed in a toe-in arrangement or a toe-out arrangement.

DETAILED DESCRIPTION

An electromobility vehicle according to one embodiment of the present invention will be described below with reference to the drawings.

Figure 1:
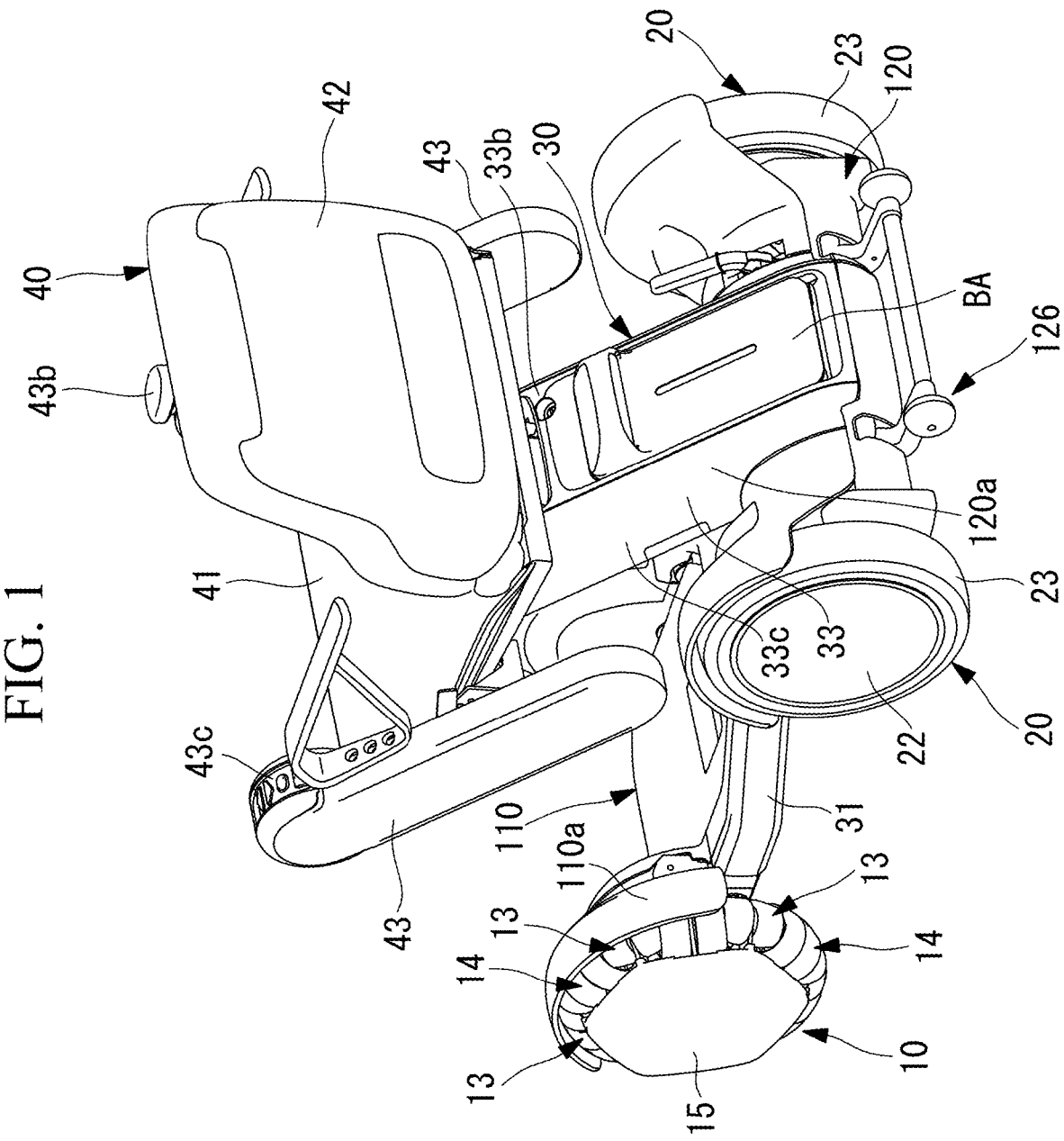
FIG. 1 is a rear perspective view of an electromobility vehicle according to one embodiment of the present invention.
Figure 2:
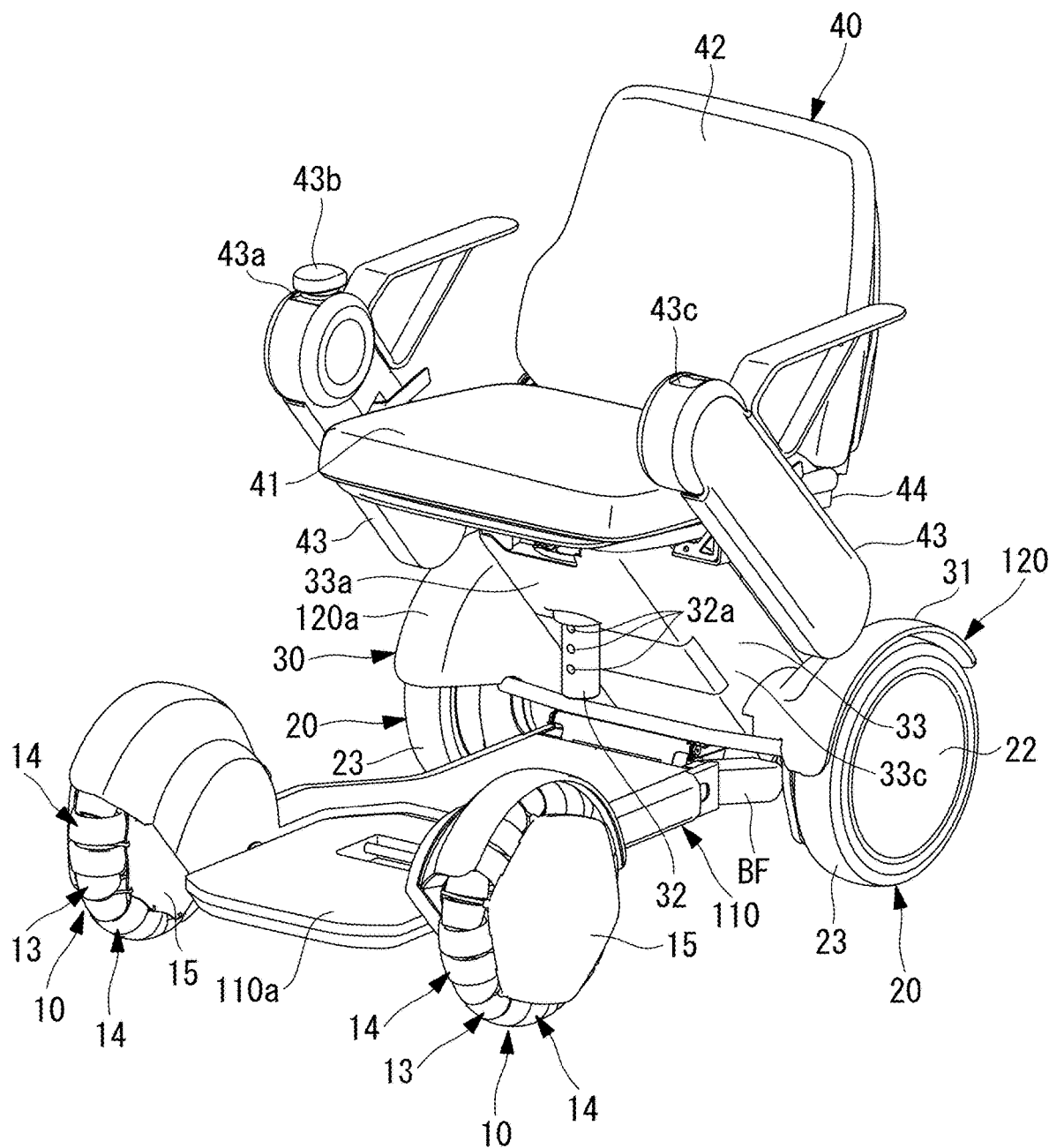
FIG. 2 is a front perspective view of the electromobility vehicle of this embodiment.
Figure 3:
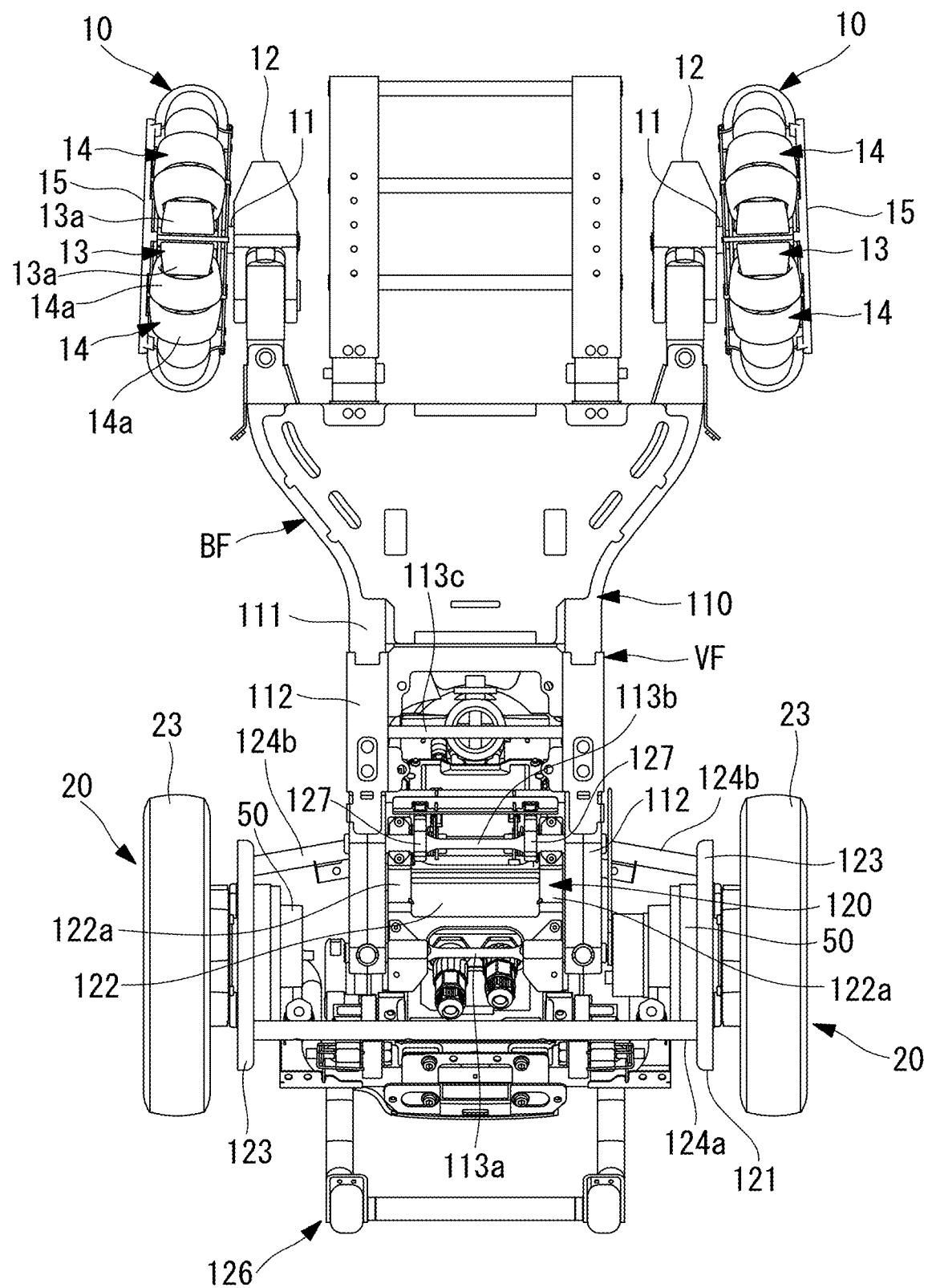
FIG. 3 is a bottom view of the electromobility vehicle of this embodiment in a state where its components are removed so that its frame is exposed.

As illustrated in FIGS. 1 to 3, the electromobility vehicle, which is designed as a single seater, includes a main mobility unit 30. The main mobility unit 30 includes a pair of front wheels 10, a pair of rear wheels 20 which are non-omnidirectional wheels (wheels that are not omnidirectional), and a body 31 supported by the front wheels 10 and the rear wheels 20. Also, the electromobility vehicle includes a seat unit (seat) 40 detachably mounted to the main mobility unit 30, a motor (drive device) 50 mounted to the main mobility unit 30 and configured to drive at least one of the pair of front wheels 10 and the pair of rear wheels 20. In the following explanations, a direction parallel to a length dimension of the vehicle may be referred to as a "longitudinal direction" and a direction parallel to a width dimension of the vehicle may be referred to as a "width direction."

In this embodiment, the motors 50 are each connected to the corresponding one of the pair of rear wheels 20 and the two rear wheels 20 can be individually driven by these motors 50. The motors 50 may also be configured to transmit driving force to the pair of front wheels 10 via a power transmission unit such as a belt and a gear.

The front wheels 10 are supported by the body 31 via an axle 11 and a suspension 12. Also, ground contact surfaces of the front wheels 10 are formed by a plurality of rollers 13, 14 arranged in a circumferential direction of the front wheels 10. The roller 13 is smaller than the roller 14 and the rollers 13 and the rollers 14 are alternately arranged in the circumferential direction of the front wheels 10.

More specifically, the front wheels 10 includes a hub 15 mounted to the axle 11 and a plurality of roller support shafts aligned in a circumferential direction of the hub 15 and each supported by the hub 15, and the rollers 13, 14 are each rotatably supported by the corresponding one of the roller support shafts. It should be noted that the hub 15 may be directly mounted to the axle 11 via a bearing or the like, and may be mounted to the axle 11 via a buffer member or any other intermediate members. The roller support shafts each extend in a direction orthogonal to a radial direction of the axle 11 in a plane orthogonal to the axle 11.

Since such features are provided, each of the rollers 13, 14 can be rotated about the axis extending in the direction orthogonal to the radial direction of the axle 11 and the front wheels 10 are configured as omnidirectional wheels which travel in any directions with respect to the ground contact surface.

Also, as illustrated in FIG. 3, etc., each of the rollers 13 has a pair of roller pieces 13a and the roller pieces 13a are formed such that their outer diameters gradually decrease from one end to the other end along the rotation axis. More specifically, the roller pieces 13a have a substantially truncated conical shape and are mounted to the roller support shaft such that their end faces on their large-diameter sides face one another.

The outer circumferential surfaces of the roller pieces 13a are made from a material having rubber-like elasticity. The outer circumferential surfaces of the roller pieces 13a each include a plurality of grooves 13b each extending in the circumferential direction (see FIG. 9). Since the grooves 13b are provided, a plurality of protrusions 13c are formed in the outer circumferential surfaces of the roller pieces 13a.

Each roller 14 has a pair of roller pieces 14a. The roller pieces 14a are formed such that their outer diameters gradually decrease from one end to the other end along the rotation axis. More specifically, the roller pieces 14a have a substantially truncated conical shape and are mounted to the roller support shaft such that their end faces on their large-diameter sides face one another.

Figure 9:
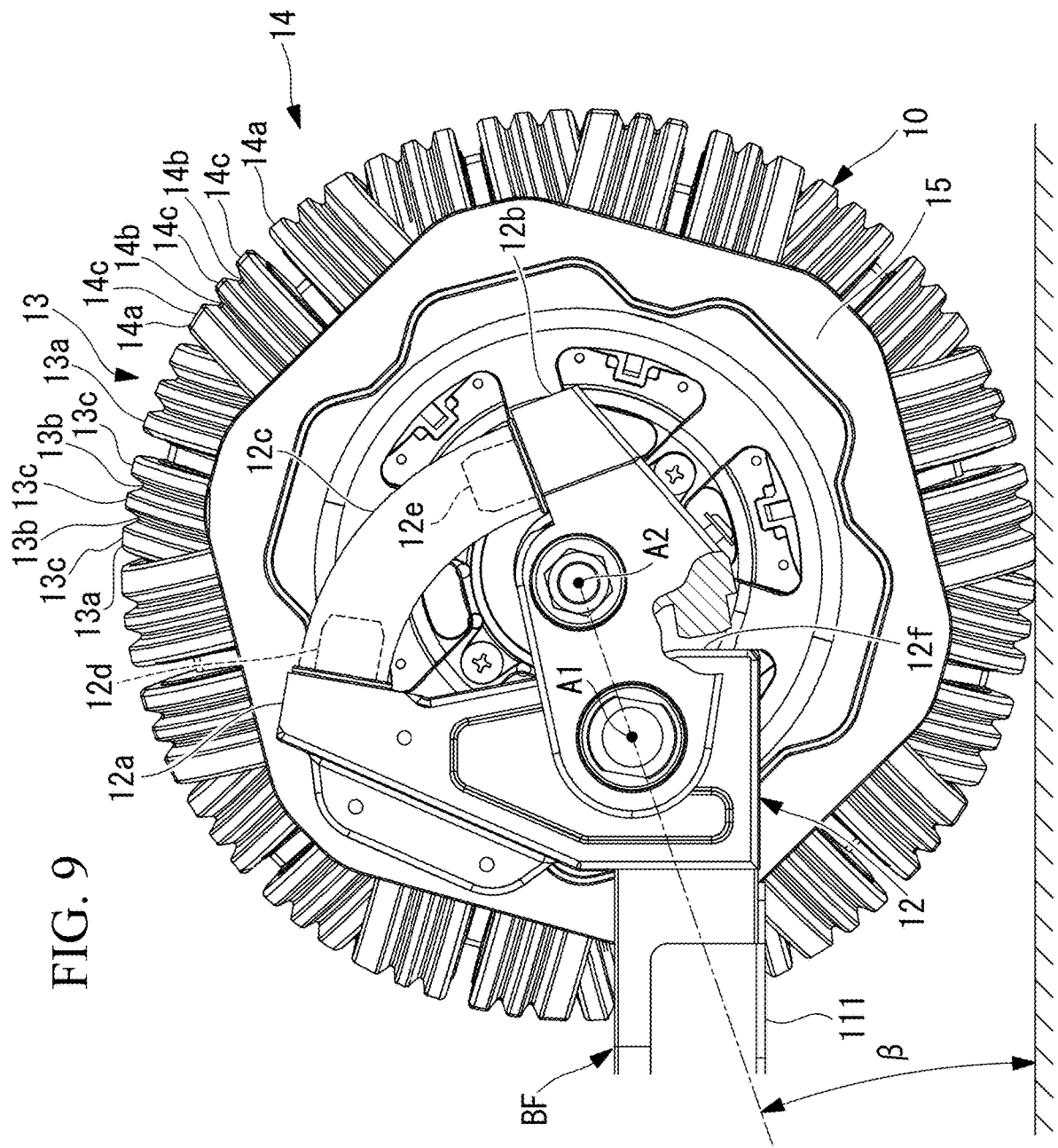
FIG. 9 is a cross-sectional side view of part of a suspension of the electromobility vehicle of this embodiment.

The outer circumferential surfaces of the roller pieces 14a are made from a material having rubber-like elasticity and the outer circumferential surfaces of the roller pieces 14a each include a plurality of grooves 14b each extending in the circumferential direction (see FIG. 9). Since the grooves 14b are provided, a plurality of protrusions 14c are formed in the outer circumferential surfaces of the roller pieces 14a. It should be noted that FIGS. 1 to 3 do not depict the grooves 13b, 14b and the protrusions 13c, 14c for reasons associated with presentation of the drawings.

As illustrated in FIG. 3, etc., a recess is formed in a small-diameter end of the roller pieces 14a. The rollers 13, are each supported by corresponding one of the roller support shafts such that part of the small-diameter end of one of the roller pieces 13a of an adjacent roller 13 enters the recess. The roller pieces 13a, 14a have a truncated conical shape and the part of the small-diameter end of the roller pieces 13a enters the recess of the small-diameter end of the roller pieces 14a, so that the outer circumferential surface of the front wheel 10 is placed in a state where it has a substantially circular shape.

In this embodiment, the rear wheels 20 include an axle (which may also serve as a main spindle of the motor 50), a hub 22 mounted to the axle, and an outer circumferential member 23 provided on and along an outer circumference of the hub 22 with an outer circumferential surface of the outer circumferential member 23 formed by a material having rubber-like elasticity, but this does not mean that use of an omnidirectional wheel in the same manner as the front wheel 10 is excluded.

The main mobility unit 30 includes a front-wheel-side vehicle body 110 and a rear-wheel-side vehicle body 120 detachably coupled to the front-wheel-side vehicle body 110. The front-wheel-side vehicle body 110 is formed so that it extends along the ground and has a front-wheel-side frame 111 to which the axle 11 of the front wheel 10 is mounted via the suspension 12; and a front-wheel-side cover 110a provided so that it covers at least part of the front-wheel-side frame 111 and used in protection of the front-wheel-side frame 111, used as a portion on which feet of the rider seated in the seat unit 40 are rested, used as a luggage carrier unit, used as a mud guard, or used for any other purposes.

The front-wheel-side frame 111 is made from a material suitable for obtaining a strength such as metal and, for example, as illustrated in FIG. 3, has a pair of side members 112 aligned in the width direction and extending in the longitudinal direction and first to third cross members 113a to 113c arranged at intervals in the longitudinal direction and each extending in the vehicle-width direction so as to interconnect the pair of side members 112. The first cross member 113a out of the cross members 113a to 113c is provided at a rear end of the pair of side members 112, and the second cross member 113b is arranged on the vehicle-front side relative to the first cross member 113a.

The rear-wheel-side vehicle body 120 includes, as illustrated in FIGS. 1 to 3, etc., a rear-wheel-side frame 121 that supports a motor 50 and a rear wheel 20 on each side in the vehicle-width direction of the rear-wheel-side vehicle body and supports the seat unit 40 at its upper end; and a rear-wheel-side cover 120a provided so as to cover at least part of the rear-wheel-side frame 121 and to be used in protection of the rear-wheel-side frame 121, used as a mud guard, or used for any other purposes.

Figure 4:
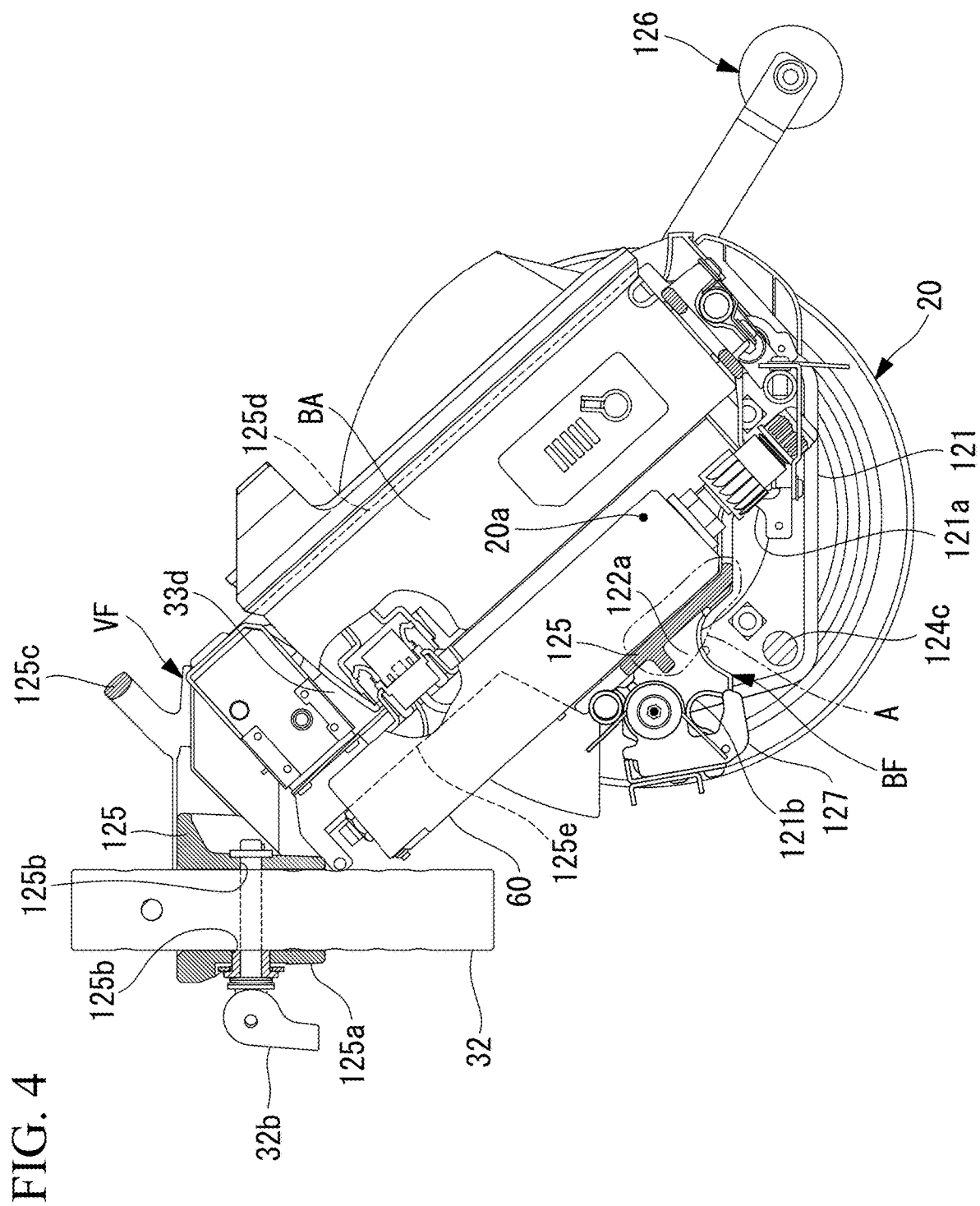
FIG. 4 is a cross-sectional view of main components of the electromobility vehicle of this embodiment.
Figure 5:
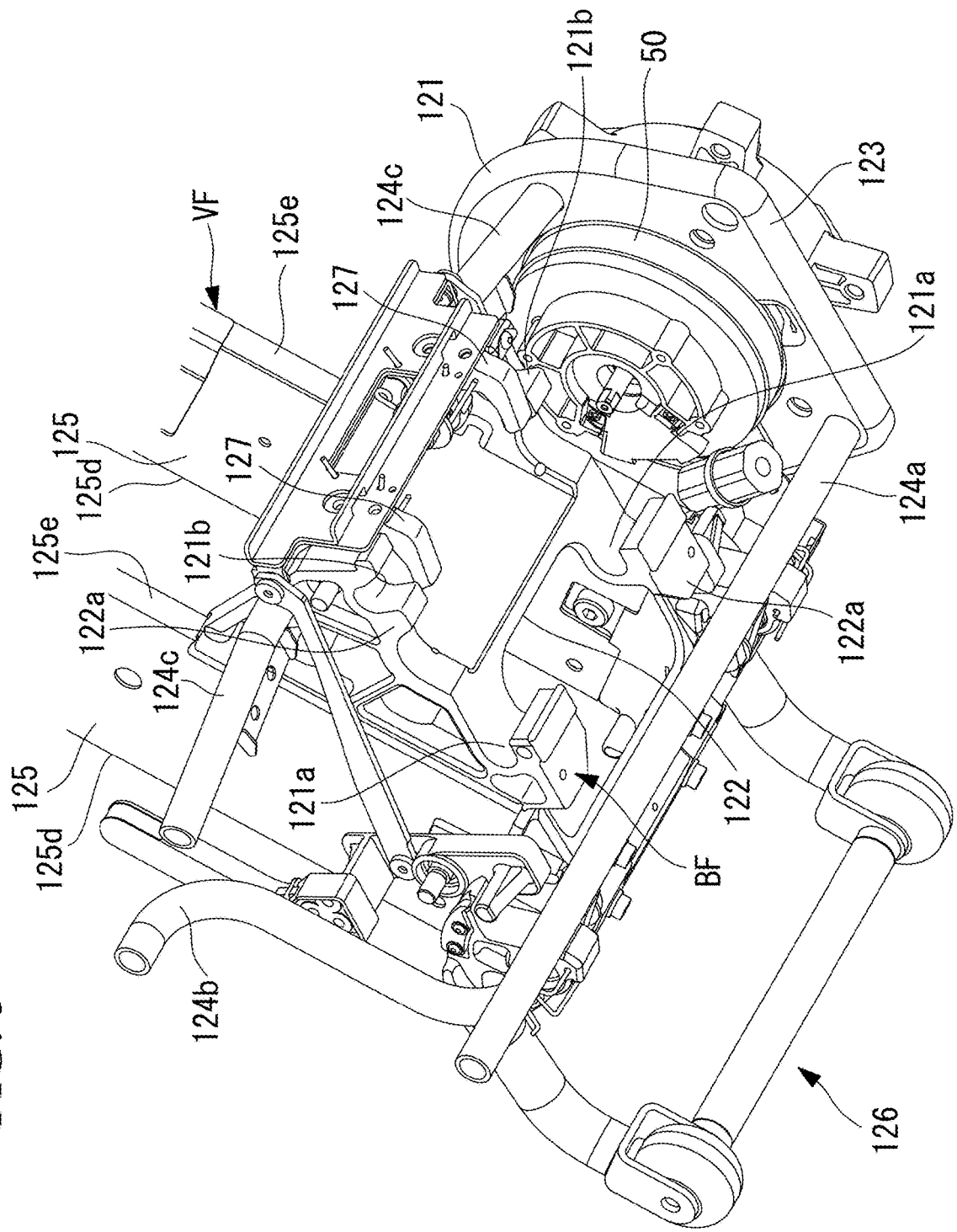
FIG. 5 is a perspective view of a rear-wheel-side frame in a state where one motor and a motor fixing unit of the electromobility vehicle of this embodiment are removed.
Figure 6:
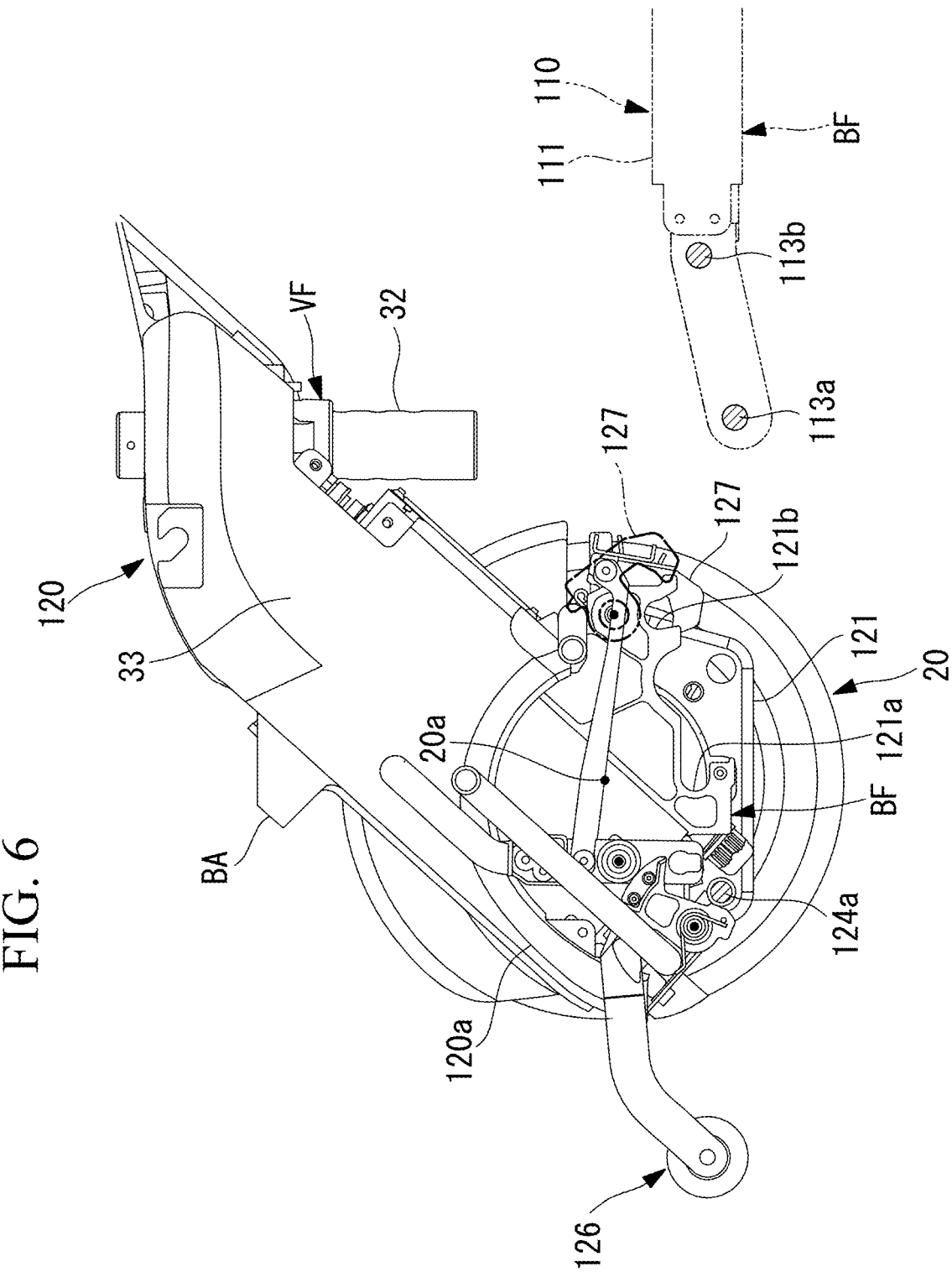
FIG. 6 is a diagram illustrating a coupling structure of a front-wheel-side frame and the rear-wheel-side frame of the electromobility vehicle of this embodiment.
Figure 7:
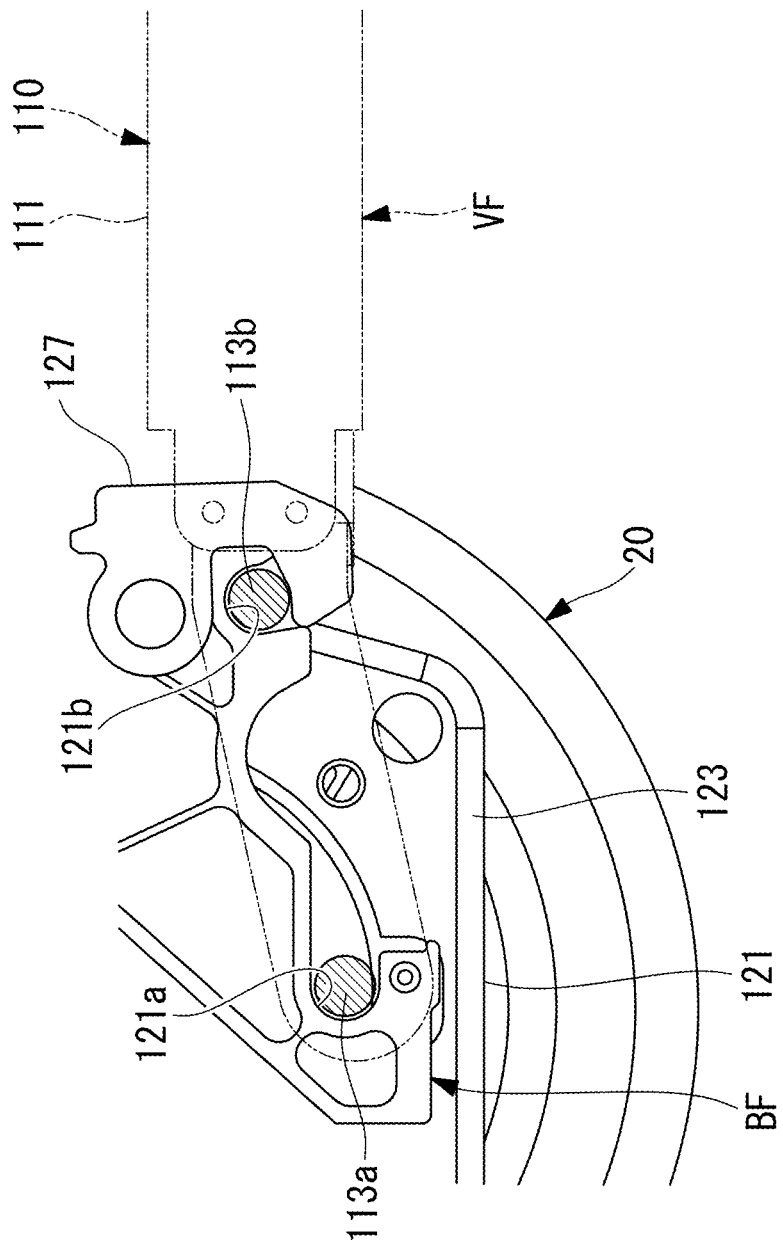
FIG. 7 is a diagram illustrating how to couple the front-wheel-side frame and the rear-wheel-side frame of the electromobility vehicle of this embodiment to each other.

The rear-wheel-side frame 121 is made from a material suitable for obtaining a strength such as metal and includes, for example, as illustrated in FIGS. 3 and 5, a lower-side member 122 having a pair of side members 122a aligned in the width direction and each extending in the longitudinal direction; a pair of motor fixing units 123 aligned in the vehicle-width direction, where the motors 50 with corresponding one of the rear wheels 20 mounted thereto are fixed to corresponding one of the motor fixing units 123; a plurality of cross members 124a to 124c each extending in the vehicle-width direction, coupling the pair of motor fixing units 123 to one another, and fixing the pair of motor fixing units 123 to the lower-side member 122; and a support unit frame 125 whose lower-end side is fixed to the side members 122a, the cross members 124a to 124c, etc., where the seat mounting member 32 for attaching the seat unit 40 is mounted to an upper-end side thereof (see FIG. 4).

Also, as illustrated in FIG. 5, etc., the rear-wheel-side frame 121 includes a rollover prevention member 126 for prevention of rollover of the electromobility vehicle toward the vehicle-rear side. One end of the rollover prevention member 126 is supported by the rear-wheel-side frame 121 so that it can be swung in the up-and-down direction.

It should be noted that a seat support unit 33 for supporting the seat unit 40 is formed on the body 31, where the seat support unit 33 is configured by the support unit frame 125 and a portion of the rear-wheel-side cover 120a that covers the support unit frame 125. The support unit frame 125 is inclined from the lower end to the upper end toward the vehicle-front side, as a result of which the seat support unit 33 is also inclined from a lower end to an upper end toward the vehicle-front side. Since the support unit frame 125 has such a shape, the center of gravity of the rear-wheel-side vehicle body 120 is arranged on the vehicle-front side relative to the rotation axis 20a of the rear wheel 20 to such an extent that it can be clearly recognized.

As illustrated in FIGS. 1 and 2, the seat support unit 33 includes a front face 33a, a back face 33b, and a pair of side faces 33c arranged between the front face 33a and the back face 33b. As illustrated in FIG. 4, a handle section 125c is provided at the upper end of the support unit frame 125 in one piece therewith. The handle section 125c protrudes from an upper end of the back face 33b of the seat support unit 33. The position of the handle section 125c grasped by a hand is preferably arranged on the front side relative to the rotation axis 20a of the rear wheel 20 of the rear-wheel-side vehicle body 120 in a state where it is coupled to the front-wheel-side vehicle body 110.

Also, as illustrated in FIGS. 1 and 4, a rechargeable battery BA is detachably mounted to the seat support unit 33. The front face 33a and the back face 33b of the seat support unit 33 are inclined from a lower end to an upper end toward the vehicle-front side. The back face 33b includes an opening of the storage space 33d for accommodating the battery BA therein. Also, a control unit 60 which will be described later is arranged inside the seat support unit 33.

The seat mounting member 32 is a member that has its length dimension in the up-and-down direction. A plurality of positioning holes 32a are provided in the seat mounting member 32 at intervals in the up-and-down direction (see FIG. 2). Each positioning hole 32a extends through the seat mounting member 32 in a direction orthogonal to its length dimension. On the upper end side of the support unit frame 125, a cylindrical section (seat mounting section) 125a is provided so that the seat mounting member 32 is inserted into and passed through the cylindrical section 125a in the up-and-down direction. The cylindrical section 125a includes a support-unit-side hole 125b which extends therethrough in the longitudinal direction. An inner shape of the cylindrical section 125a is slightly larger than an outer shape of the seat mounting member 32.

The seat mounting member 32 is inserted into the cylindrical section 125a; any of the positioning holes 32a and any of the support-unit-side holes 125b are aligned with each other; the positioning member 32b is attached to the cylindrical section 125a so as to be inserted into and passed through the support-unit-side hole 125b and the positioning hole 32a; and thus the seat mounting member 32 is mounted. Also, a height position of the seat mounting member 32 relative to the main mobility unit 30, i.e., a height position of the seat unit 40 can be adjusted by changing the positioning hole 32a which the positioning member 32b is inserted through.

As illustrated in FIGS. 1 and 2, the seat unit 40 includes a seat surface unit 41 on which a rider is seated, a backrest unit 42, a pair of control arms 43 aligned in the vehicle-width direction, and a seat surface frame 44 fixed below the seat surface unit 41 and detachable from the seat mounting member 32 of the seat support unit 33.

At an upper end of a right-side control arm 43, an operation unit 43a is provided which includes an operation lever 43b. In a state where no force is applied to the operation lever 43b, the operation lever 43b is arranged at a neutral position by a biasing member (not shown) arranged inside the operation unit 43a, and the rider can take the operation lever 43b out of the neutral position to shift the operation lever 43b leftward, rightward, forward, and backward by his/her right hand.

A signal in accordance with a direction and an amount of shifting of the operation lever 43b is transmitted from the operation unit 43a to a control unit 60 which will be described later and the motors 50 are driven in accordance with the signal. For example, when the operation lever 43b is taken out of the neutral position and shifted forward, a signal that causes the motors 50 to be rotated in the direction of travel of the vehicle is transmitted, and the electromobility vehicle travels forward at a speed in accordance with the amount of shifting of the operation lever 43b. Also, when the operation lever 43b is taken out of the neutral position and shifted to the obliquely forward left, then a signal that causes a left-side motor 50 to be rotated at a speed lower than that of a right-side motor 50 in the direction of travel of the vehicle is transmitted, and the electromobility vehicle travels forward while turning to the left at a speed in accordance with the amount of shifting of the operation lever 43b.

At an upper end of a left-side control arm 43, a setting unit 43c is provided which is capable of making various settings regarding the electromobility vehicle such as maximum speed setting, driving mode setting, electromobility vehicle lock setting, etc. The setting unit 43c includes a plurality of operation buttons, a display device, etc. For example, as examples of the driving mode, an energy-saving driving mode with low power consumption, a sport driving mode which gives preference to driving performance without reducing the power consumption, a normal driving mode which is an intermediate mode between the energy-saving driving mode and the sport driving mode, and the like may be mentioned. With regard to the electromobility vehicle lock setting, setting of a pass code for locking, setting of unlock timing, and the like may be mentioned. The setting signal of the setting unit 43c is transmitted to the control unit 60 which will be described later, and the electromobility vehicle settings is registered or changed by the control unit 60.

Figure 8:
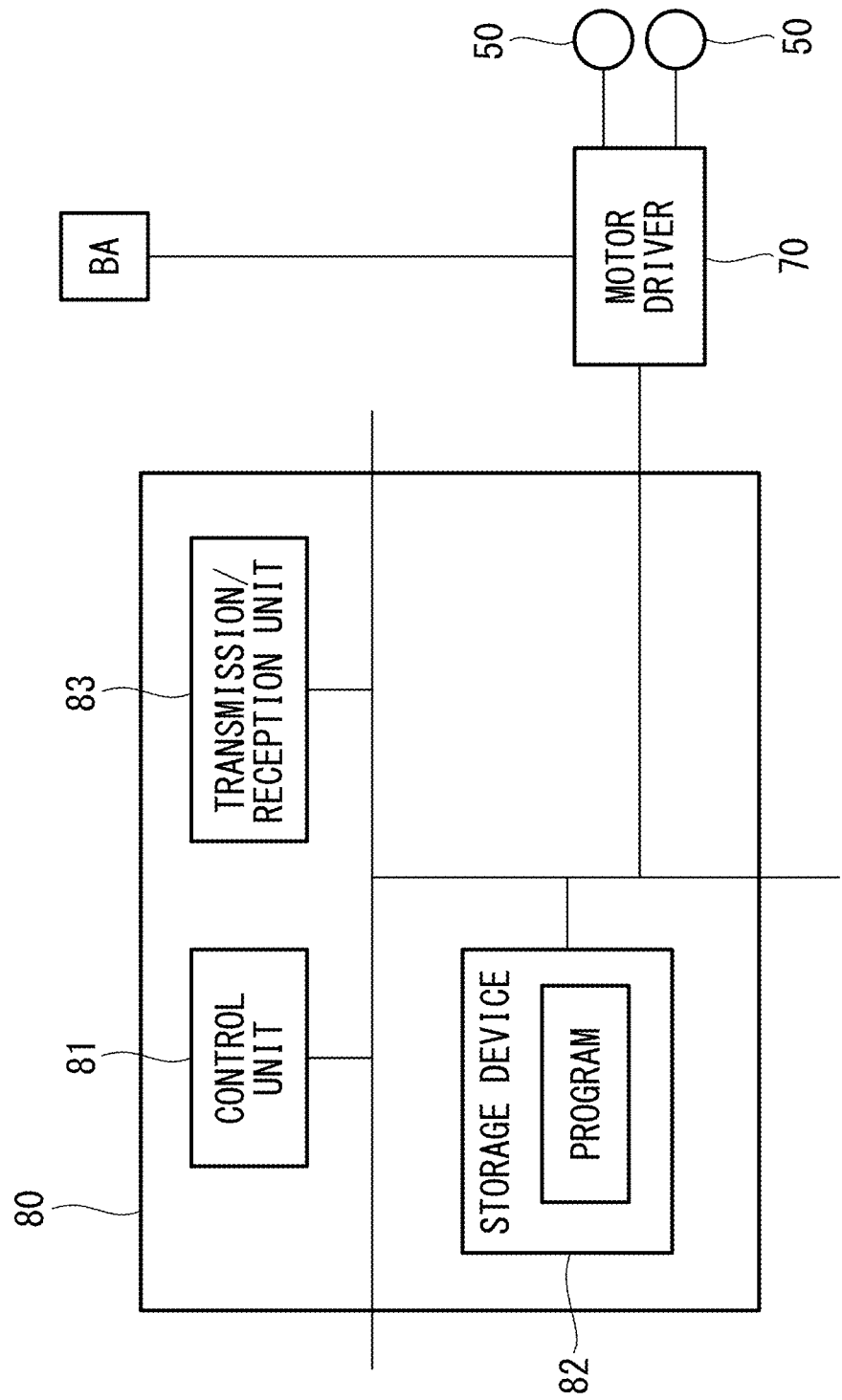
FIG. 8 is a block diagram illustrating a schematic configuration of a control unit of the electromobility vehicle of this embodiment.

The control unit 60 includes, as illustrated in FIG. 8, a motor driver 70 that drives the motors 50 and a control device 80.

The motor driver 70 is connected to the battery BA by a power line and connected to the motors 50 by a power line. The motor driver 70 supplies power to the motors 50 to drive them.

The control device 80 may include a control unit 81 which includes a CPU, a RAM unit, etc., a storage device 82 which includes a non-volatile memory unit, a ROM unit, etc., and a transmission/reception unit 83. A program that controls the electromobility vehicle is stored in the storage device 82 and the control unit 81 operates based on the program and transmits drive signals for driving the motors 50 to the motor driver 70 based on the signals from the operation unit 43a and the setting unit 43c.

As illustrated in FIG. 4 to FIG. 7, a substantially U-shaped first recess 121a which is opened toward the vehicle-front side is formed in the side members 122a of the rear-wheel-side frame 121 and, a substantially U-shaped second recess 121b which is arranged on the vehicle-front side relative to the first recess 121a and is opened downward is formed in the side members 122a of the rear-wheel-side frame 121. The first recess 121a is configured such that the first cross member 113a of the front-wheel-side frame 111 is brought into engagement therewith, and the second recess 121b is configured such that the second cross member 113b of the front-wheel-side frame 111 is brought into engagement therewith (see FIG. 7). A coupling lock member 127 for performing maintenance and release of the engagement (coupling between the front-wheel-side frame 111 and the rear-wheel-side frame 121) is provided in the rear-wheel-side frame 121.

In this embodiment, the vehicle frame VF of the body 31 is constituted by the front-wheel-side frame 111 and the rear-wheel-side frame 121. Also, in the rear-wheel-side frame 121, the lower-side member 122 having the side member 122a, the motor fixing unit 123 that supports the rear wheel 20 via the motor 50, the cross members 124a to 124c that secures the motor fixing unit 123 to the lower-side member 122, and the front-wheel-side frame 111 function as a base frame BF.

Figure 10:
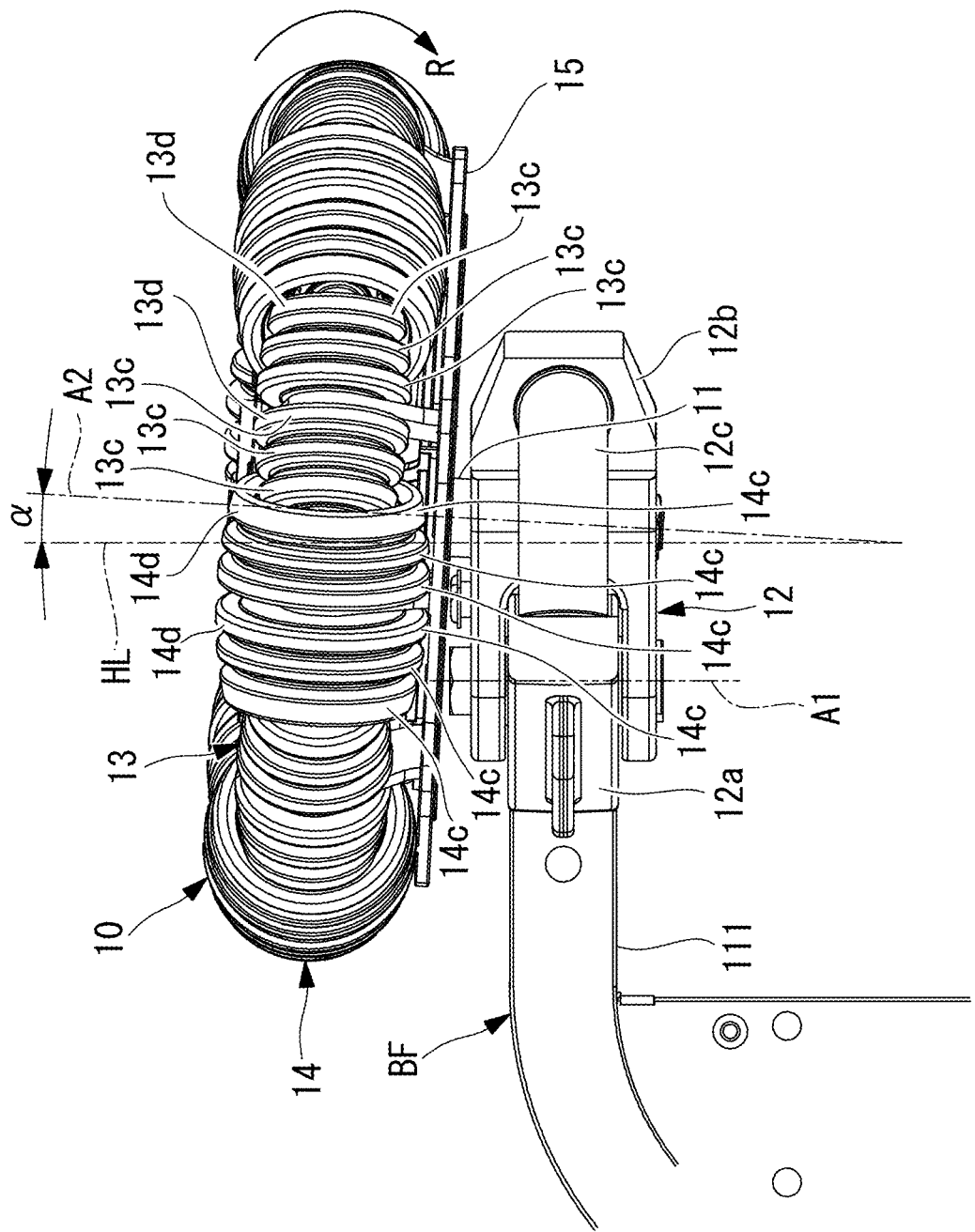
FIG. 10 is a plan view of the suspension of the electromobility vehicle of this embodiment.

As illustrated in FIGS. 3, 9, and 10, a pair of suspensions 12 aligned in the vehicle-width direction is mounted to the front end of the front-wheel-side frame 111. The suspensions 12 each includes a fixing member 12a fixed to the front end of the front-wheel-side frame 111, a support member 12b one end of which is supported by a front-end side of the fixing member 12a, where the support member 12b is configured to be swingable around a first axis A1 extending in the vehicle-width direction, and a biasing member 12c that biases another-end-side of the support member 12b toward the vehicle-front side such as a coil spring. The biasing member 12c may be a member obtained by covering a coil spring by a cylindrical member having rubber-like elasticity as illustrated in FIGS. 9 and 10.

As illustrated in FIG. 9, a protruding section 12d which protrudes from an upper-end side of the fixing member 12a toward the vehicle-front side is inserted into one end of the biasing member 12c in an axial direction and a protruding section 12e which protrudes upward from the other-end side of the support member 12b and toward the vehicle-rear side is inserted into to the other end of the biasing member 12c in the axial direction, by virtue of which the biasing member 12c is held between the fixing member 12a and the support member 12b.

As illustrated in FIG. 9, the axle 11 of the front wheel extends between the portion of the support member 12b supported by the fixing member 12a and the portion where the protruding section 12e is provided so as to be fixed thereto. It should be noted that, as illustrated in FIG. 10, a second axis A2 which is the central axis of the axle 11 is inclined forward with respect to a horizontal line HL orthogonal to the direction of travel of the vehicle (forward direction). In a plan view, the angle α made by the second axis A2 and the horizontal line HL is preferably 2 to 15 degrees, but it may be any other angle depending on conditions. The central axis of the axle 11 also corresponds to the rotation axis of the front wheel 10.

In this embodiment, since the axle 11 is a straight cylindrical member, the front wheel 10 rotates about the second axis A2. The second axis A2 is arranged on the vehicle-front side relative to the first axis A1 and above the first axis A1.

As illustrated in FIG. 9, a restricting section 12f is provided at a front end of the fixing member 12a, and the restricting section 12f abuts on the support member 12b at a predetermined swing position from the vehicle-rear side, and is configured to restrict the swinging of the support member 12b toward the vehicle-front side at the predetermined swing position.

As illustrated in FIG. 9, in this embodiment, when the electromobility vehicle remains at rest without any load acting thereupon on the ground contact surface which is a flat plane, the angle β made by the straight line passing the first axis A1 of the support member 12b and the central axis of the axle 11 (second axis A2) and the ground contact surface will be 15 degrees or more. The angle β should be 5 degrees or more but it is preferably 10 degrees or more. At this point, in this embodiment, the support member 12b is not in abutment on the restricting section 12f, but the support member 12b and the restricting section 12f may be placed in abutment on each other.

Figure 11:
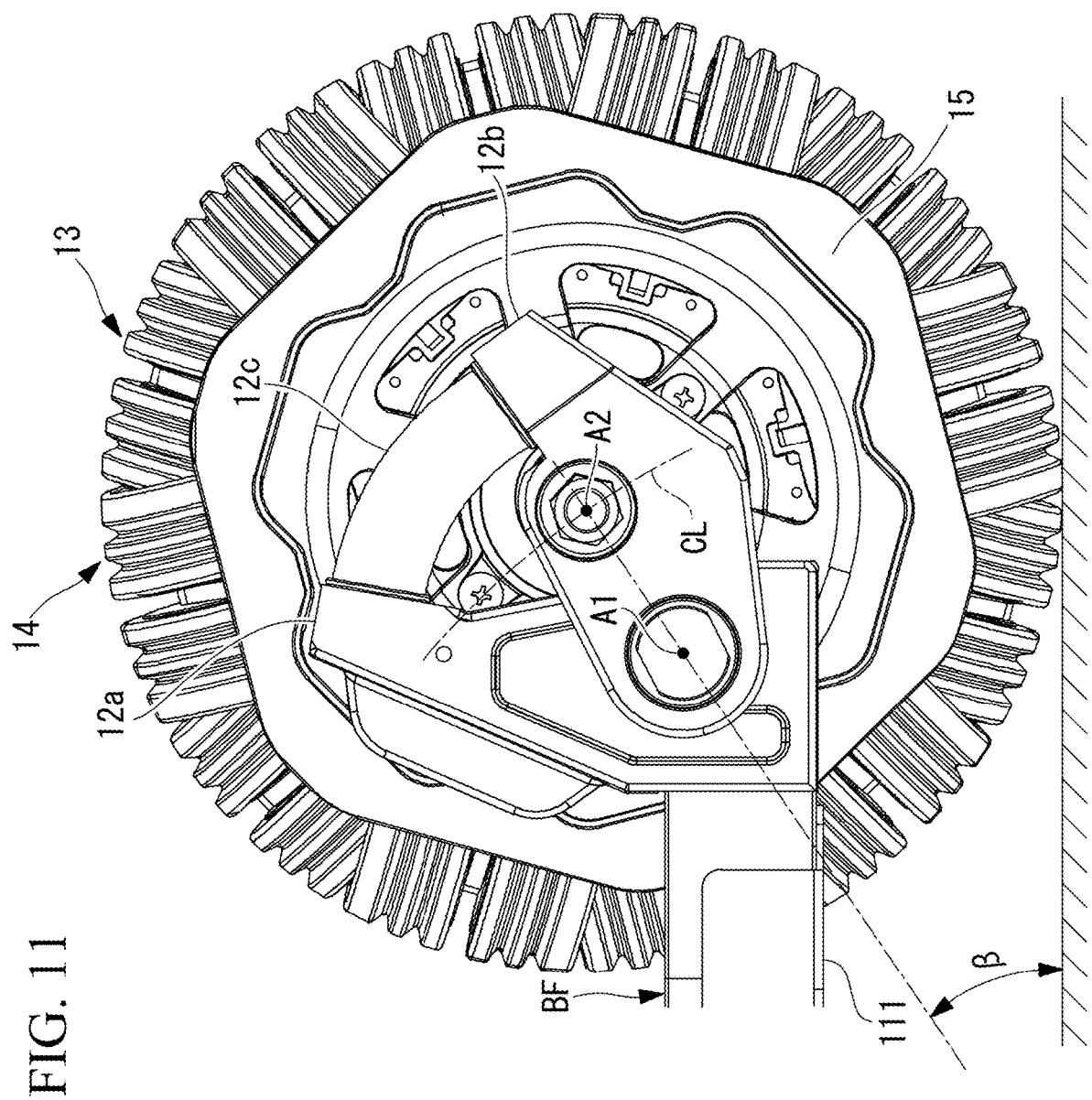
FIG. 11 is an explanatory diagram illustrating operation of the suspension of the electromobility vehicle of this embodiment.

When the rider is seated in the seat unit 40 in the above-described state, the support member 12b swings toward the vehicle-rear side by a weight of the rider and, for example, the angle β will be about 35 degrees as illustrated in FIG. 11. In this state, the support member 12b is spaced apart from the restricting section 12f and placed in a floating state. Also, when force is applied to the axle 11 in this state from below or from the front side, the axle 11 is moved toward the vehicle-rear side along a circular-arc path CL about the first axis A1. At this point, since the second axis A2 is arranged on the vehicle-front side relative to the first axis A1 and above the first axis A1, the second axis A2 is allowed to be moved toward the vehicle-rear side. It should be noted that a larger angle β will facilitate movement of the second axis A2 toward the vehicle-rear side.

According to this embodiment, since the outer circumferential surface of the front wheels 10 is formed by the plurality of rollers 13, 14, vibrations are generated when the rollers 13, 14 come into contact with the ground one after another in response to the rotation of the front wheels 10. However, since the front wheels 10 is mounted to the vehicle frame VF via the suspension 12, the vibrations of the front wheels 10 will be transmitted to the vehicle frame VF in a state where the vibrations are reduced by the suspension 12.

Also, since the pair of front wheels 10 are supported by the suspension 12 such that the pair of front wheels 10 is placed in the toe-in state, the end faces of the rollers 13, 14 are substantially perpendicular to their rotation axes, but the end faces will be arranged obliquely with respect to the ground contact surface, so that the impact force generated when the rollers 13, 14 come into contact with the ground will be mitigated.

In this manner, reduction in the vibrations transmitted from the front wheel 10 to the seat unit 40 is performed through the arrangement of the front wheels 10 and the suspension 12 between the front wheels 10 and the vehicle frame VF, so that it is not necessary to undesirably reduce the stiffness between the vehicle frame VF and the seat unit 40 and between the suspension 12 and the rear wheel 20 for the purpose of prevention of vibrations, which is advantageous in terms of stabilization of the posture of the rider seated in the seat unit 40.

Also, then the axles 11 of the front wheel 10 are configured to be moved toward the vehicle-rear side relative to the vehicle frame VF by virtue of the suspension 12 against the biasing force of the biasing member 12c when force acts upon the front wheel 10 from the vehicle-front side or from below the front wheel 10.

Here, as the rollers 13, 14 of the front wheel 10 come into contact with the ground one after another, each of the rollers 13, 14 will experience collisions with the ground contact surface and the individual collisions become one of the resistances to smooth rolling of the front wheel 10. In other words, the rolling resistance of the front wheels 10 increases instantaneously by the collision of the rollers 13, 14 with the ground contact surface.

Since the rolling resistance acts as the resistance to the electromobility vehicle traveling forward, the vibrations due to the collision of the rollers 13, 14 with the ground contact surface also contains many vibration components in the longitudinal direction of the vehicle. As a result, since the other-end side of the support member 12b of the suspensions 12 and the axle 11 of the front wheel 10 are configured to be moved toward the vehicle-rear side against the biasing force when force is applied to the front wheel 10, then the vibrations generated due to the collision of the rollers 13, 14 with the ground contact surface can be efficiently absorbed.

Here, as compared with a case where the pair of front wheels 10 is arranged in parallel with each other, the components of the force toward the vehicle-rear side acting upon the axle 11 of the front wheel 10 during traveling tend to increase if the pair of front wheels 10 is in the toe-in state. As a result, since the pair of front wheels 10 is in the toe-in state and the support member 12b are configured to be moved toward the vehicle-rear side relative to the vehicle frame VF against the biasing force, the vibrations generated due to the collision of the rollers 13, 14 with the ground contact surface can be more effectively reduced.

From another viewpoint, the suspensions 12 has the support member 12b supported by the vehicle frame VF so that it is swingable around the first axis A1; and the biasing member 12c that applies to the support member 12b biasing force to the vehicle-front side. The axle 11 of the front wheel 10 is supported by the support member 12b such that the front wheel 10 is rotated about the second axis A2 arranged on the vehicle-front side relative to the first axis A1 and above the first axis A1.

As a result, the vibrations due to the collision of the rollers 13, 14 contain many vibration components in the longitudinal direction of the vehicle but, since the axle 11 of the front wheel 10 is arranged on the vehicle-front side relative to the first axis A1 which is the center of swing of the support member 12b and above the first axis A1, the axle of the front wheel 10 is allowed to move toward the vehicle-rear side when the vibration is applied to the front wheel 10. As a result, the vibrations generated due to the collision of the rollers 13, 14 with the ground contact surface can be efficiently absorbed.

It should be noted that, when the weight of the rider is heavy and the load acting upon the front wheel 10 is increased, the vibrations generated due to the collision of the rollers 13, 14 with the ground contact surface tends to become large. However, at the same time, the angle β becomes large when the load acting upon the front wheel 10 becomes larger, so that the components toward the vehicle-rear side of the movement of the second axis A2 due to the force acting upon the front wheel 10 increase. As a result, when the load acting upon the front wheel 10 becomes larger, then the vibration inputs toward the vehicle-rear side will be able to be reduced more effectively.

Also, the support member 12b is supported by the vehicle frame VF such that it is swingable in the longitudinal direction of the vehicle, and the movement of the support member 12b relative to the vehicle frame VF in the vehicle-width direction is restricted or limited. However, since the front wheels 10 are omnidirectional wheels whose outer circumferential surface is formed by the plurality of rollers 13, 14, the vibrations and impact force are absorbed or damped by the rotation of the rollers 13, 14 in a case where vibrations in the vehicle-width direction body and impact force act upon the front-end side of the electromobility vehicle. In other words, the above-described configuration is advantageous in achieving in a simplified manner the structure for supporting the axle 11 of the front wheels 10 which are the omnidirectional wheels so as to be movable in the longitudinal direction of the vehicle.

Also, in this embodiment, the rear wheel 20 has the outer circumferential member 23 extending on and along the entire circumference, and the cross-sectional shape of the outer circumferential member 23 is substantially constant over the entire circumference. Since the cross-sectional shape of the outer circumferential member 23 of the rear wheel 20 is substantially constant over the entire circumference in this manner, it is made possible to reduce the vibrations generated by the rear wheel 20. It should be noted that the rear wheel is preferably configured as a pneumatic tire. Such a configuration is advantageous in reducing the vibrations generated by the rear wheels 20.

Also, in this embodiment, when the rider is seated in the seat unit 40 in a static state on a flat ground, the support member 12b is configured to be moved toward the vehicle-rear side against the biasing force of the biasing member 12c, the support member 12b and the restricting section 12f are configured to be placed in the non-contact state, and the support member 12b is placed in the floating state. As a result, the vibrations due to the collision of the rollers 13, 14 of the front wheel 10 are less likely to be transmitted to the vehicle frame VF.

Also, the outer circumferential surfaces of the rollers 13, 14 are made from a material having rubber-like elasticity and the outer circumferential surface includes the grooves 13b, 14b that extend in the circumferential direction. Since the outer circumferential surfaces of the rollers 13, 14 in this manner have the grooves 13b, 14b extending in the circumferential direction, the outer circumferential surfaces of the rollers 13, 14 are more readily deformed in the direction of the axis of the rollers 13, 14 and the impact force at the time of the rollers 13, 14 coming into contact with the ground is mitigated.

Also, the vehicle frame VF includes the base frame BF that supports the front wheels 10 and the rear wheels 20 and the support unit frame 125 that extends upward from the base frame BF and supports the seat unit 40 at its upper end. At least part of the lower-end side of the support unit frame 125 is arranged on the vehicle-rear side relative to the rotation axis of the rear wheel 20. And the cylindrical section (seat mounting section) 125a in the support unit frame 125 for mounting of the seat unit 40 is arranged on the vehicle-front side relative to the lower-end side of the support unit frame 125.

When these features are provided, the vibrations transmitted from the front wheel 10 to the front-end side of the base frame BF are transmitted to the portions in the vicinity of the motor fixing unit (rear-wheel support unit) 123 in the base frame BF and then transmitted via the support unit frame 125 to the cylindrical section 125a, and transmitted from the cylindrical section 125a to the seat unit 40. In this manner, since the transmission path of the vibrations is extended, the vibrations are damped on the transmission path, and vibrations transmitted from the front wheels 10 to the seat unit 40 can be effectively reduced.

Also, as compared with a case where the pair of front wheels 10 is arranged in parallel with each other, the components of the force toward the vehicle-rear side acting upon the axle 11 of the front wheel 10 during traveling increase if the pair of front wheels 10 is in the toe-in state. Here, while the vehicle frame VF generally has its length dimension in the longitudinal direction of the vehicle, and, when comparison is made between a case where impact force in the lateral direction (for example, the up-and-down direction) is applied to the front end of the vehicle frame VF and another case where impact force of the same magnitude in the longitudinal direction is applied thereto, the impact force in the lateral direction can cause larger movement of the vehicle frame VF.

In other words, since the pair of front wheels 10 is placed in the toe-in state, more components of the force acting from the pair of front wheels 10 upon the front end of the vehicle frame VF can be directed toward the vehicle-rear side, so that the vibrations of the vehicle frame VF due to the input become small. Further, the components toward the vehicle-rear side of the vibrations input from the front wheel 10 to the vehicle frame VF will experience change in their transmission direction, so that they will be less likely to be transmitted to the upper-end side of the support unit frame 125 extending upward from the rear end of the vehicle frame VF. In this manner, vibrations transmitted from the front wheels 10 to the seat unit 40 can be effectively reduced.

On the other hand, if the support unit frame 125 that supports the seat unit 40 is provided in the vicinity of the rear-wheel support unit in the base frame BF, then a possible concern is that sufficient tractive force cannot be generated in the front wheels 10. However, since the cylindrical section 125a for mounting of the seat unit 40 in the support unit frame 125 is arranged on the vehicle-front side relative to the lower end of the support unit frame 125, the force acting downward at the front end of the base frame BF while the rider is seated in the seat unit 40 is effectively increased, and the tractive force generated in the front wheels 10 can be enhanced.

Here, the lower end of the support unit frame 125 is a connection section in the support unit frame 125 for connection to the base frame BF and for bearing the load acting upon the seat unit 40. In the case of this embodiment, the support unit frame 125 is connected to the side member 122a of the lower-side member 122 within a range A in FIG. 4, and the cylindrical section 125a is arranged on the vehicle-front side relative to the range A.

From another viewpoint, at least part of the lower-end side of the support unit frame 125 is arranged on the vehicle-rear side relative to the rotation axis 20a of the rear wheel 20 and the support unit frame 125 extends from its lower end to its upper end in a direction oblique to the vehicle-front side.

When these features are provided, the vibrations transmitted from the front wheel 10 to the front-end side of the base frame BF are transmitted to the portions in the vicinity of the portion of the base frame BF where the rear wheel is supported via the motor 50 and then transmitted via the support unit frame 125 to the seat unit 40. In this manner, since the transmission path of the vibrations is extended, the vibrations are damped on the transmission path, and vibrations transmitted from the front wheels 10 to the seat unit 40 can be effectively reduced.

Also, since the support unit frame 125 is inclined from its lower end to its upper end toward the vehicle-front side, the force acting downward at the front end of the base frame BF while the rider is seated in the seat unit 40 is effectively increased, and the tractive force generated in the front wheel 10 can be enhanced.

Here, as illustrated in FIG. 4, the portion equal to or more than half of a vehicle rear-side edge 125d of the support unit frame 125 viewed in the vehicle-width direction is inclined toward the vehicle-front side and, when an angle made by an inclined portion of the vehicle rear-side edge 125d with respect to the vertical direction is 15 degrees or more, then the force acting downward at the front end of the base frame BF as described above can be effectively increased. It should be noted that, even in a case where the vehicle rear-side edge 125d has a stepped shape, the stepped shape is admissible as long as the vehicle rear-side edge 125d as a whole extends toward the vehicle-front side and upward and the support unit frame 125 thereby enhances the tractive force generated in the front wheel 10. On the other hand, as illustrated in FIG. 4, it is more preferable that the portion equal to or more than half of a vehicle front-side edge 125e of the support unit frame 125 viewed in the vehicle-width direction extends toward the vehicle-front side and upward.

It should be noted that what has been described in the context of this embodiment indicates that the axle 11 of the front wheel 10 is mounted via the suspension 12 to the vehicle frame VF. In contrast to this, a pair of small motors may be provided which individually drive the front wheels 10 and a pair of one small motor and one front wheel 10 may be mounted via the suspension 12 to the vehicle frame VF.

Also, although it is possible to disassemble the vehicle frame VF into the front-wheel-side frame 111 and the rear-wheel-side frame 121 in this embodiment, the vehicle frame VF does not need to be configured to be disassembled and, alternatively, other components of the vehicle frame VF may be disassembled therefrom.

Also, it is possible to use an air spring or a torsion spring in place of the coil spring as the biasing member 12c and it is also possible to use any other member that can bias the support member 12b toward the vehicle-front side. It should be noted that it is also possible to provide a damper member in parallel or in series with the biasing member 12c.

Also, in this embodiment, the axle 11 is a straight cylindrical member and, as a result, an angle at which the axle 11 is to be mounted to the support member 12b coincides with the angle α and setting of the toe-in state is facilitated. In contrast to this, a region between a portion of the axle 11 to be fixed to the support member 12b and another portion thereof that rotationally supports the front wheel 10 may be bent. In this case, it is preferable that the second axis A2 serves as the central axis of the portion that rotationally supports the front wheel 10 and that the angle α made by the second axis A2 and the horizontal line HL is 2 to 15 degrees.

Also, the angle α is preferably 3 degrees or 4 degrees or more in view of reduction in vibration from the front wheel 10. On the other hand, it is more preferably 11 degrees or less so as to ensure improvement of straight traveling stability, maneuverability, fuel efficiency, and the like.

It should be noted that the front wheel 10 is a wheel arranged on the front side relative to the rear wheel 20 and the rear wheel 20 is a wheel arranged on the rear side relative to the front wheel 10. As a result, other wheels may be provided on the front side relative to the front wheel 10, between the front wheel 10 and the rear wheel 20, or on the rear side relative to the rear wheel 20. The above-described effects can also be obtained in these cases.

Figure 12:
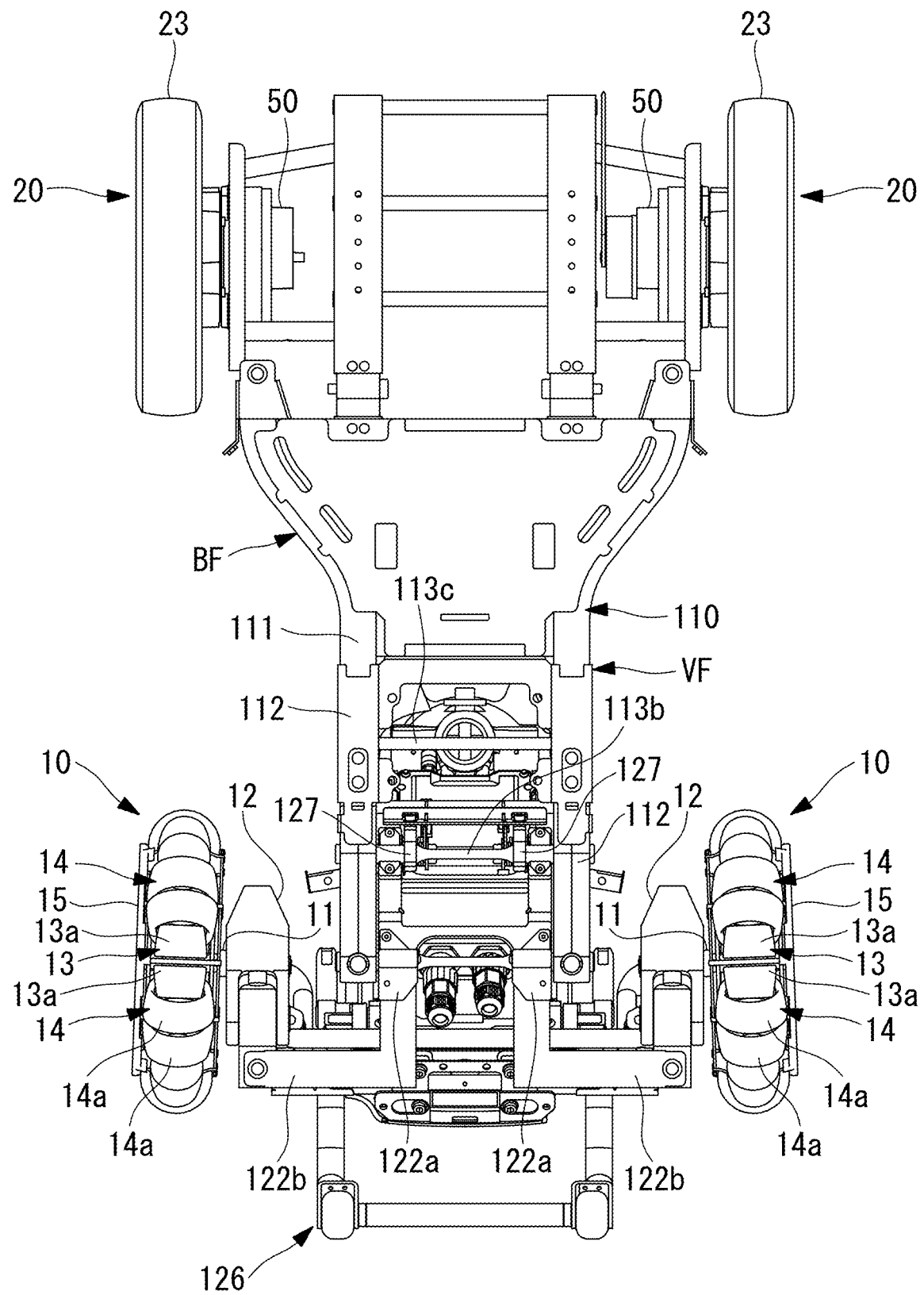
FIG. 12 is a bottom view of the electromobility vehicle of a modified example of this embodiment in a state where its components are removed so that its frame is exposed.

It should be noted that, as illustrated in FIG. 12, the pair of front wheels 10 may be supported via the suspension 12 at the position of the pair of rear wheels 20 in FIG. 3, and the pair of rear wheels 20 may be supported at the position of the pair of front wheels 10 in FIG. 3. In the following description, the front wheel 10 is referred to as "the wheel 10" and the rear wheel 20 is referred to as "the wheel 20." The structure of the wheel 10, the structure of the suspension 12, and the structure of the wheel 20 are as in the embodiment that has been described in the foregoing. Also, the wheels 20 are supported by the base frame BF via the motor 50 and the wheels 20 are driven by the motor 50.

Figure 13:
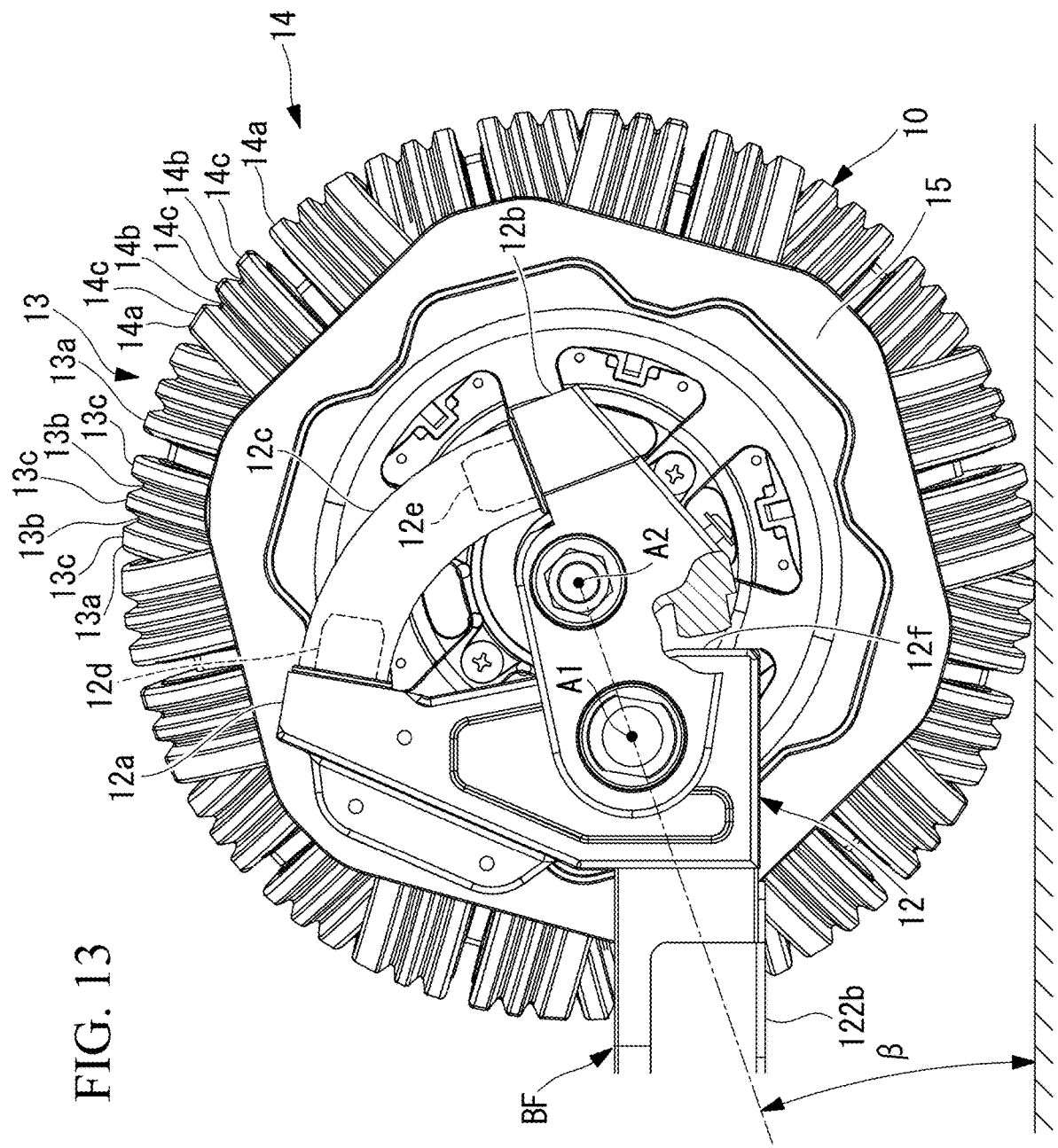
FIG. 13 is a plan view of a suspension of the electromobility vehicle of the modified example of this embodiment.

As illustrated in FIGS. 12 and 13, the fixing member 12a of the suspension 12 is fixed to the frame 122b that extends from the side member 122a. As in the embodiment that has been described in the foregoing, the one-end side of the support member 12b is supported by the front-end side of the fixing member 12a, and the support member 12b is swingable around the first axis A1 extending in the vehicle-width direction. The biasing member 12c biases the other-end side of the support member 12b toward the vehicle-front side.

Also, as in the embodiment that has been described in the foregoing, the axle 11 of the wheel 10 is passed through and fixed between the portion of the support member 12b supported by the fixing member 12a and the portion where the protruding section 12e is provided. In addition, as in the embodiment that has been described in the foregoing, the second axis A2 which is the central axis of the axle 11 is inclined frontward relative to the horizontal line HL orthogonal to the direction of travel of the vehicle (see FIG. 10). The angle α made by the second axis A2 and the horizontal line HL in the plan view is preferably 2 to 15 degrees but the angle may be any other angles depending on conditions.

Since the pair of wheels 10 is placed in the toe-in state in this manner, the roller pieces 13a, 14a of the rollers 13, are rotated about their rotation axes as the electromobility vehicle travels forward. For example, when the electromobility vehicle travels forward and the roller pieces 13a, 14a come into contact with the ground, the roller pieces 13a, 14a are rotated in a direction indicated by an arrow R in FIG. 10.

When the pair of wheels 10 is not in the toe-in state, rotational force about the rotation axis does not act upon the roller pieces 13a, 14a as the electromobility vehicle travels forward, or does not act thereupon easily. As a result, when the electromobility vehicle continues to travel forward, situations are likely to occur where one location in the circumferential direction of the roller pieces 13a, 14a always remain in contact with the ground. This leads to considerable wear of the one location in the circumferential direction of the roller pieces 13a, 14a as compared with the other portions in the circumferential direction (uneven wear).

Such uneven wear in the roller pieces 13a, 14a may lead to increase in vibration during rotation of the wheel 10. For example, when the roller pieces 13a, 14a are rotated about their rotation axes after one location in the circumferential direction of the roller pieces 13a, 14a has experienced uneven wear, an unevenly worn portion and other portions that are not unevenly worn will be randomly arranged on the outer circumferential surface of the wheel 10. In other words, steps will be made between the portion that is unevenly worn and the portions that are not unevenly worn, which leads to increase in the vibrations.

In other words, it is preferable that the roller pieces 13a, 14a are worn uniformly over its entire circumference. When the angle α made by the second axis A2 and the horizontal line HL in the plan view is 2 to 15 degrees, the roller pieces 13a, 14a are rotated about their rotation axes as the electromobility vehicle travels forward, so that prevention of such uneven wear can be expected.

Here, the angle α made by the second axis A2 and the horizontal line HL in the plan view is more preferably 2 to 6 degrees. In not a few situations, the electromobility vehicle travels forward at a speed of 5 to 10 kilometers per hour. If the length of the outer circumference of the wheel 10 is for example one meter or less, then the wheel 10 will make two to three revolutions per second. In other words, the roller pieces 13a, 14a will come into contact with the ground two to three times per second. When the angle α made by the second axis A2 and the horizontal line HL is large, then rotational force that the roller pieces 13a, 14a receive from the ground contact surface becomes large as the electromobility vehicle travels forward. Due to the rotational force, the roller pieces 13a, 14a may be rotated at an unnecessarily high speed, which is not desirable in view of reduction in vibration and noise.

The roller pieces 13a, 14a have a certain inertial mass. Also, friction and the like in the bearing between the roller pieces 13a, 14a and their support shafts acts as resistance force for rotation of the roller pieces 13a, 14a. As a result, when the rotational force received from the ground contact surface is large, inertial force of the roller pieces 13a, 14a and the resistance force act in a direction opposite to the rotational force, and larger rotational force leads to a higher degree of wear in the outer circumferential surface at one end in the axial direction of the roller pieces 13a, 14a. The one end in the axial direction corresponds to the one end of the roller pieces 13a, 14a at which they come into first contact with the ground. The resistance force may vary depending on machining accuracy of the support shaft, precision of the bearing, and the like, and the variation leads to variation in the wear.

For example, in the roller pieces 13a, 14a illustrated in FIG. 10, the portions indicated by the reference signs 13d and 14d correspond to the above-described outer circumferential surface on one end-side in the axial direction. When the grooves 13b, 14b are formed in the roller pieces 13a, 14a, the outer circumferential surface at one end in the axial direction defines the protrusion 13c. It should be noted that that roller pieces 13a, 14a that have the protrusion 13c in many cases are more susceptible to wear than the roller pieces that do not have the protrusion 13c. When uneven wear occurs and the outer circumferential surface at one end in the axial direction of the roller pieces 13a is worn as compared with other portions, the uneven wear causes creation of a step between the pairs of the roller pieces 13a, 14a, which leads to increase in the vibrations.

In contrast, if the angle α made by the second axis A2 and the horizontal line HL in the plan view is 2 to 6 degrees, then the rotational force that the roller pieces 13a, 14a receive is not excessively increased when the roller pieces 13a, 14a come into contact with the ground as the electromobility vehicle travels forward at the speed of 5 to 10 kilometers per hour. This is advantageous in prevention of the above-described uneven wear.

These effects of uneven wear prevention can also be achieved by the above-described embodiment in which the wheel 10 is used as the front wheel. Also, these effects of uneven wear prevention can also be achieved even in a case where the wheel 10 is supported by the front-wheel-side frame 111, the frame 122b, etc., without intervention of the suspension 12 or a case where the wheel 10 is supported by the front-wheel-side frame 111, the frame 122b, etc., via a suspension of another type, for example, a suspension that only absorbs an impact load in the up-and-down direction and vibrations.

It should be noted that these effects of the uneven wear prevention can also be achieved in a case where, as described above, the wheel 10 is used as the rear wheel and the pair of wheels 10 is in the toe-out state, which is particularly effective when the angle α made by the second axis A2 and the horizontal line HL in the plan view is 2 to 6 degrees.

On the other hand, even in a case where the wheel 10 is used as the rear wheel as described above, when the rider is seated in the seat unit 40, the weight of the rider causes the support member 12b to be swing toward the vehicle-rear side and the support member 12b is placed in the floating state where it is spaced apart from the restricting section 12f. Also, when force acts upon the axle 11 from below or from the front in this state, the axle 11 is moved toward the vehicle-rear side along the circular-arc path CL (see FIG. 11) about the first axis A1.

In addition, since the pair of front wheels 10 is supported by the suspension 12 such that the pair of wheel 10 is placed in the toe-in state, the end faces of the rollers 13, 14 are substantially perpendicular to their rotation axes, but the end faces will be arranged obliquely with respect to the ground contact surface, so that the impact force generated when the rollers 13, 14 come into contact with the ground will be mitigated.

In this manner, reduction in the vibrations transmitted from the wheel 10 to the seat unit 40 is achieved by the arrangement of the wheel 10 and the suspension 12 between the wheel 10 and the vehicle frame VF. As a result, it is not necessary to undesirably reduce the stiffness between the vehicle frame VF and the seat unit 40 for the purpose of prevention of vibration, which is advantageous in stabilization of the posture of the rider seated in the seat unit 40.

Also, while the vibrations caused by the collision of the rollers 13, 14 with the ground contact surface includes many vibration components in the longitudinal direction of the vehicle, the wheel 10 is configured to be moved against the biasing force of the biasing member 12c toward the vehicle-rear side. As a result, the vibrations generated due to the collision of the rollers 13, 14 with the ground contact surface can be efficiently absorbed.

In a conventional electromobility vehicle, when the front-wheel-side floor frame and the rear-wheel-side floor frame are coupled to each other such that they can tilt in the roll direction and when the front-wheel-side floor frame is biased by the spring relative to the rear-wheel-side floor frame toward the central position in the roll direction, the seat that is supported by the front-wheel-side floor frame or the rear-wheel-side floor frame is likely to be tilted in the roll direction, which is not desirable in terms of stabilization of posture of a rider.

The following aspects have been made in view of such circumstances and an object of the following aspects is to provide an electromobility vehicle capable of stabilizing the posture of the rider and ensuring that the rider feels less strongly the vibrations generated as the rollers come into contact with the ground one after another in response to the rotation of the wheels.

An electromobility vehicle on which one person is to be seated to ride according to a first aspect of the present invention includes a vehicle frame; a seat mounted on the vehicle frame; a suspension attached to a front-end side of the vehicle frame; a pair of front wheels arranged in a vehicle width direction and supported by the suspension; at least one rear wheel supported by the vehicle frame; and a drive device that drives either of the front wheels and the rear wheel, in which the front wheel is an omnidirectional wheel whose outer circumferential surface is formed by a plurality of rollers and the front wheels are supported by the suspension such that the front wheels are placed in toe-in arrangement.

According to this aspect, since the outer circumferential surfaces of the front wheels are formed by the plurality of rollers, vibrations are generated when the rollers come in contact with the ground one after another according to the rotation of the front wheels. However, since the front wheels are mounted to the vehicle frame via the suspension, the vibrations of the front wheels are transmitted to the vehicle frame in a state where they are reduced by the suspension.

Also, since the front wheels are supported by the suspension so as to be in toe-in arrangement, even when each roller has an end face substantially perpendicular to a rotation axis, the end face is arranged obliquely with respect to a ground contact surface. Thus, impact force generated when each roller comes into contact with the ground is mitigated, and the vibrations generated by the front wheels are reduced.

In this manner, reduction in the vibrations transmitted from the front wheels to the seat is performed through arrangement of the front wheels and the suspension between the front wheels and the vehicle frame, so that it is not necessary to undesirably reduce stiffness between the vehicle frame and the seat and between the suspension and the rear wheel for the purpose of prevention of vibrations, which is advantageous in terms of stabilization of the posture of the rider seated in the seat.

In the above-described aspect, it is preferable that the suspension includes a support member that supports an axle of the front wheel and a biasing member that applies biasing force to the support member, the biasing force is directed to a vehicle-front side, and the suspension is configured such that the axle is moved toward a vehicle-rear side relative to the vehicle frame against the biasing force when force acts upon the front wheel from a vehicle-front side or from a lower side.

As the rollers of the front wheel come into contact with the ground one after another, each of the rollers will collide with the ground contact surface and the individual collisions become one of resistances to smooth rolling of the front wheels. In other words, rolling resistances of the front wheels increases instantaneously by the collision of the rollers with the ground contact surface. Since the rolling resistance acts as a resistance to the electromobility vehicle traveling forward, the vibrations due to the collision of the rollers with the ground contact surface also contains many vibration components in the longitudinal direction of the vehicle. As a result, when the support member of the suspensions and the axle of the front wheels are configured to be moved toward the vehicle-rear side against the biasing force when a force is applied to the front wheels, then the vibrations generated due to the collision of the rollers with the ground contact surface can be efficiently absorbed.

Here, as compared with a case where the pair of front wheels is arranged in parallel with each other, components of the force acting upon the axle of the front wheel toward the vehicle-rear side during traveling tend to increase if the pair of front wheels is in the toe-in arrangement. As a result, since the pair of front wheels is in toe-in arrangement and the support member is configured to be moved toward the vehicle-rear side relative to the vehicle frame against the biasing force, the vibrations generated due to the collision of the rollers with the ground contact surface can be more effectively reduced.

In the above-described aspect, it is preferable that the suspension includes a support member supported by the vehicle frame such that the support member is swingable around a first axis extending in a vehicle-width direction and a biasing member that applies biasing force to the support member, the biasing force is directed to a vehicle-front side, and the axle of the front wheel is supported by the support member in a state in which the axle is arranged at a vehicle-front side and an upper side relative to the first axis and the front wheel is rotated around a second axis extending in the vehicle-width direction.

Vibrations due to the collision of the rollers contain many vibration components in the longitudinal direction of the vehicle. Meanwhile, since the axle of the front wheel is arranged at a vehicle-front side and an upper side relative to the first axis which is the center of swinging of the support member, the axle of the front wheel is allowed to move toward the vehicle-rear side when the vibration acts upon the front wheel. As a result, the vibrations generated due to the collision of the rollers with the ground contact surface can be efficiently absorbed.

Here, as compared with a case where the pair of front wheels is arranged in parallel with each other, the components of the force acting upon the axle of the front wheel toward the vehicle-rear side during traveling tend to increase if the pair of front wheels are in toe-in arrangement. As a result, since the pair of front wheels is in toe-in arrangement and the axle of the front wheel is allowed to move toward the vehicle-rear side against the biasing force, the vibrations due to the collision of the rollers with the ground contact surface can be more effectively reduced.

Also, the support member is supported by the vehicle frame such that it is swingable in the longitudinal direction of the vehicle, and the movement of the support member relative to the vehicle frame in the vehicle-width direction is restricted or limited. However, since the front wheels are the omnidirectional wheels whose outer circumferential surface is formed by the plurality of rollers, in a case where vibrations in the vehicle-width direction and impact force act upon the front-end side of the electromobility vehicle, the vibrations and impact force are absorbed or damped by the rotation of the rollers. In other words, the above-described configuration is advantageous in achieving in a simplified manner the structure for supporting the axle of the front wheels which are the omnidirectional wheels so as to be movable in the longitudinal direction of the vehicle.

In the above-described aspect, it is preferable that the rear wheel has an outer circumferential member that extends on an entire circumference thereof, and a cross-sectional shape of the outer circumferential member is substantially constant over the entire circumference.

Since the cross-sectional shape of the outer circumferential member of the rear wheel is substantially constant over the entire circumference in this manner, it is made possible to reduce the vibrations generated by the rear wheel.

Also, it is more preferable that the rear wheels are pneumatic tires. Such a configuration is advantageous in reducing the vibrations generated by the rear wheel.

In the above-described aspect, it is preferable that the suspension further includes a restricting section that abuts on the support member and thereby restricts movement of the support member by the biasing force in a vehicle-front direction at a predetermined position, and the suspension is configured such that the support member is moved to the vehicle-rear side against the biasing force when a rider is seated in the seat in a static state on a flat ground and thereby the support member and the restricting section do not have contact with each other.

When these features are provided, the front wheels are placed in a floating state while the rider is seated in the seat, the vibrations due to the collision of the rollers of the front wheels are less likely to be transmitted to the vehicle frame.

In the above-described aspect, it is preferable that an outer circumferential surface of each of the rollers is made of a material having rubber-like elasticity and a plurality of grooves are provided on the outer circumferential surface, wherein the grooves extends in a circumferential direction of the roller.

If the grooves are provided in this manner in the outer circumferential surfaces of the rollers, then it may appear that vibrations are also generated when protrusions formed between the grooves come into contact with the ground, which may cause further vibrations from the front wheels. However, by virtue of a fact that the grooves extending in the circumferential direction are provided in the outer circumferential surfaces of the rollers, the outer circumferential surface of the rollers is more readily deformed in a direction of the axis of the rollers, and the impact force at the time of the rollers coming into contact with the ground will be practically mitigated.

In the above-described aspect, it is preferable that the vehicle frame includes a base frame that supports the front wheels and the rear wheel and a support portion frame that extends upward from the base frame and supports the seat at an upper end of the support portion frame, at least a part of a lower-end side of the support portion frame is positioned at a vehicle-rear side relative to a rotation axis of the rear wheel, and that a seat mounting section for mounting of the seat in the support unit frame is arranged on the front side of the vehicle relative to the lower-end side of the support unit frame.

When these features are provided, the vibrations transmitted from the front wheel to the front-end side of the base frame are transmitted to the rear-end side of the base frame and then transmitted via the support unit frame to the seat mounting section, and transmitted from the seat mounting section to the seat. In this manner, since a transmission path of the vibrations is extended, the vibrations are damped on the transmission path, and vibrations transmitted from the front wheels to the seat can be effectively reduced.

Also, as compared with a case where the pair of front wheels is arranged in parallel with each other, the components of the force acting upon the axle of the front wheel toward the vehicle-rear side during traveling increase if the pair of front wheels is in toe-in arrangement. Here, the vehicle frame generally has its length dimension in the longitudinal direction of the vehicle and, when comparison is made between a case where impact force in the lateral direction (for example, an up-and-down direction) is applied to the front end of the vehicle frame and another case where impact force of the same magnitude in the longitudinal direction is applied thereto, the impact force in the lateral direction can cause movement of the vehicle frame by a larger amount.

In other words, when the pair of front wheels is placed in the toe-in state, more components of the force acting upon the front end of the vehicle frame from the pair of front wheels can be directed toward the vehicle-rear side, so that vibrations of the vehicle frame due to the input are reduced. Further, the components toward the vehicle-rear side of the vibration input from the front wheel to the vehicle frame experiences change in their transmission direction, so that they are less likely to be transmitted to the upper-end side of the support unit frame extending upward from the rear end of the vehicle frame. In this manner, vibrations transmitted from the front wheels to the seat can be effectively reduced.

On the other hand, if the support unit frame that supports the seat is provided in the vicinity of a rear-wheel support unit of the base frame, a possible concern is that sufficient tractive force cannot be generated in the front wheels. However, since the seat mounting section to which the seat is mounted in the support unit frame is arranged on the vehicle-front side relative to the lower-end side of the support unit frame, the force acting downward at the front end of the base frame when the rider is seated in the seat is effectively increased, and the tractive force generated in the front wheel can be enhanced.

In the above-described aspect, it is preferable that the vehicle frame includes a base frame that supports the front wheels and the rear wheel and a support portion frame that extends upward from the base frame and supports the seat at an upper end of the support portion frame, at least a part of a lower-end side of the support portion frame is positioned at a vehicle-rear side relative to a rotation axis of the rear wheel, and the support portion frame extends upward and toward a vehicle-front side.

When these features are provided, the vibrations transmitted from the front wheel to the front-end side of the base frame are transmitted to the rear-end side of the base frame and then transmitted via the support unit frame to the seat. In this manner, since a transmission path of the vibrations is extended, the vibrations are damped on the transmission path, and vibrations transmitted from the front wheels to the seat can be effectively reduced.

Also, as compared with a case where the pair of front wheels is arranged in parallel with each other, the components of the force acting upon the axle of the front wheel toward the vehicle-rear side during traveling increase if the pair of front wheels is placed in the toe-in state. Here, the vehicle frame generally has its length dimension in the longitudinal direction of the vehicle and, when comparison is made between a case where impact force in the lateral direction (for example, the up-and-down direction) is applied to the front end of the vehicle frame and another case where impact force of the same magnitude in the longitudinal direction is applied thereto, the impact force in the lateral direction can cause movement of the vehicle frame by a larger amount.

In other words, when the pair of front wheels is in a toe-in arrangement, more components of the force acting upon the front end of the vehicle frame from the pair of front wheels can be directed toward the vehicle-rear side, so that vibrations of the vehicle frame due to the input are reduced. Further, the components toward the vehicle-rear side of the vibration input from the front wheel to the vehicle frame experiences change in their transmission direction, so that they are less likely to be transmitted to the upper-end side of the support unit frame extending upward from the rear end of the vehicle frame. In this manner, the vibrations transmitted from the front wheels to the seat can be effectively reduced.

On the other hand, since the support unit frame is inclined from the lower end to the upper end toward the vehicle-front side, the force acting downward at the front end of the base frame when the rider is seated in the seat is effectively increased, and the tractive force generated in the front wheel can be enhanced.

An electromobility vehicle of a second aspect of the present invention includes a vehicle frame; a seat mounted on the vehicle frame; a suspension attached to the vehicle frame; a pair of wheels arranged in a vehicle-width direction and supported by the suspension; and a drive device that drives either of a non-omnidirectional wheel supported by the support frame and the wheels, wherein the wheel is an omnidirectional wheel whose outer circumferential surface is formed by a plurality of rollers; and the wheel is supported by the suspension such that the wheels are placed in a toe-in arrangement or a toe-out arrangement.

According to this aspect, since the pair of wheels is placed in the toe-in state or the toe-out arrangement, the rollers are rotated about the rotation axis as the electromobility vehicle travels forward. By virtue of this, part of the circumferential direction of the rollers is protected from uneven wear, i.e., prevented from being worn significantly relative to remaining portions of the circumferential direction, which is advantageous in prevention of increase in the vibrations during traveling of the electromobility vehicle.

In the above aspects, preferably, rotation axes of the wheels make an angle of 2 to 6 degrees with respect to a horizontal line perpendicular to a direction of travel of the electromobility vehicle.

When the angle is large, rotational force about the rotation axis which the rollers receive from the ground contact surface becomes large as the electromobility vehicle travels forward at a speed of 5 to 10 kilometers per hour. This causes uneven wear of the rollers. According to this aspect, the angle made by the rotation axis of the individual wheels with respect to the horizontal line perpendicular to the direction of the travel of the electromobility vehicle is 2 to 6 degrees. As a result, the rotational force received by the each of the rollers when each of the rollers comes into contact with the ground as the electromobility vehicle travels forward at the speed of 5 to 10 kilometers per hour does not become excessively large. The angle range is advantageous in prevention of uneven wear.

According to the above aspects, the posture of the rider can be stabilized, in addition to which it is made possible to ensure that the rider feels less strongly the vibrations generated when the rollers come into contact with the ground one after another in response to the rotation of the wheels.

The invention claimed is:

1. An electromobility vehicle on which one person is to be seated to ride, the electromobility vehicle comprising:
a vehicle frame;
a seat mounted on the vehicle frame;
a suspension attached to a front-end side of the vehicle frame;
a pair of front wheels arranged in a vehicle-width direction and supported by the suspension;
at least one rear wheel supported by the vehicle frame; and
a drive device that drives either of the front wheels and the at least one rear wheel, wherein the front wheels are omnidirectional wheels whose outer circumferential surface is formed by a plurality of rollers, the front wheels are supported by the suspension such that the front wheels are placed in a toe-in arrangement, the suspension includes a support member that supports an axle of the front wheel and a biasing member that applies a biasing force to the support member, the biasing force is directed to a vehicle-front side, the suspension is configured such that the axle is moved toward a vehicle-rear side relative to the vehicle frame against the biasing force when force acts upon the front wheel from a vehicle-front side or from a lower side, the suspension further includes a restricting section that abuts the support member and to restrict movement of the support member by the biasing force in a vehicle-front direction at a predetermined position, and the suspension is configured such that the support member is moved to the vehicle-rear side against the biasing force when a rider is seated in the seat in a static state on a flat ground and thereby the support member and the restricting section do not have contact with each other.

2. An electromobility vehicle on which one person is to be seated to ride, the electromobility vehicle comprising:
a vehicle frame;
a seat mounted on the vehicle frame;
a suspension attached to a front-end side of the vehicle frame;
a pair of front wheels arranged in a vehicle-width direction and supported by the suspension;
at least one rear wheel supported by the vehicle frame; and
a drive device that drives either of the pair of front wheels and the at least one rear wheel, wherein the front wheels are omnidirectional wheels whose outer circumferential surface is formed by a plurality of rollers, the front wheels are supported by the suspension such that the front wheels are placed in a toe-in arrangement, and the vehicle frame comprises a front-wheel-side frame to which the suspension is attached, and a rear-wheel-side frame which supports the at least one rear wheel and which is detachably coupled to the front-wheel-side frame, the rear-wheel-side frame comprises a support portion frame which supports the seat at an upper end of the support portion frame and which obliquely extends toward a vehicle-front direction from a lower end side to an upper end side, the electromobility vehicle comprises a rear-wheel-side vehicle body including the rear-wheel-side frame and a rear-wheel-side cover which covers at least part of the rear-wheel-side frame, and a center of gravity of the rear-wheel-side vehicle body is positioned at a vehicle-front side relative to a rotation axis of the at least one rear wheel.

3. The electromobility vehicle according to claim 2, wherein a seat support portion is formed by the support portion frame and a part of the rear-wheel-side cover, the part covers the support portion frame, and a front surface and a rear surface of the seat support portion obliquely extend toward the vehicle-front side from the lower end side to the upper end side.

* * * * *